United States Patent
Toedtli et al.

(10) Patent No.: US 9,552,543 B2
(45) Date of Patent: Jan. 24, 2017

(54) METHOD AND APPARATUS FOR PROVING AN AUTHENTICATION OF AN ORIGINAL ITEM AND METHOD AND APPARATUS FOR DETERMINING AN AUTHENTICATION STATUS OF A SUSPECT ITEM

(71) Applicant: Hicof Inc., Wollerau (CH)

(72) Inventors: Sergej Toedtli, Bäch (CH); Sascha Toedtli, Bäch (CH); Yohan Thibault, Freienbach (CH)

(73) Assignee: Hicof Inc. (CH)

( * ) Notice: Subject to any disclaimer, the term of this patent is extended or adjusted under 35 U.S.C. 154(b) by 0 days.

(21) Appl. No.: 15/225,731

(22) Filed: Aug. 1, 2016

(65) Prior Publication Data

US 2016/0342885 A1     Nov. 24, 2016

Related U.S. Application Data

(63) Continuation of application No. PCT/EP2015/052046, filed on Feb. 2, 2015.

(30) Foreign Application Priority Data

Feb. 4, 2014    (EP) .................................. 14153785
Sep. 22, 2014    (EP) .................................. 14185775

(51) Int. Cl.
    *G06Q 30/00*       (2012.01)
    *G06K 19/10*       (2006.01)
    (Continued)

(52) U.S. Cl.
    CPC ......... *G06K 19/10* (2013.01); *G06F 17/30268* (2013.01); *G06K 7/10732* (2013.01);
    (Continued)

(58) Field of Classification Search
    USPC ........................... 235/375, 494, 437, 462.16
    See application file for complete search history.

(56) References Cited

U.S. PATENT DOCUMENTS

| 4,423,415 A | 12/1983 | Goldman |
| 4,811,408 A | 3/1989 | Goldman |
| (Continued) | | |

FOREIGN PATENT DOCUMENTS

| DE | 101 55 780 A1 | 5/2003 |
| DE | 101 62 537 A1 | 9/2003 |
| (Continued) | | |

OTHER PUBLICATIONS

Bulan et al., High Capacity Color Barcodes: Per Channel Data Encoding via Orientation Modulation in Elliptical Dot Arrays, IEEE Transaction on Image Processing, May 2011, pp. 1337-1350, vol. 20, No. 5, IEEE, Piscataway, NJ, US.
(Continued)

*Primary Examiner* — Allyson Trail
(74) *Attorney, Agent, or Firm* — Bose McKinney & Evans LLP

(57) ABSTRACT

An apparatus and method for authenticating an item wherein a code is assigned to the item and includes a plurality of modules arranged in an ideal image. A barcode is encoded within the modules and a picture of the code is printed onto the item. A picture of the printed code is recorded with a low resolution camera at high speed during the production process from which the barcode content is decoded. Irregularities in the picture are analyzed and a numerical value describing an individual imperfection profile is calculated. The numerical value of the imperfection profile depends on at least one unique feature inherently related to the original printing device. The individual imperfection profile is printed onto the item and/or a database record is generated. To authenticate a suspect item, the imperfection profile of (Continued)

the suspect item is compared with the imperfection profile of the original item.

20 Claims, 18 Drawing Sheets

(51) Int. Cl.
    *G06K 19/06*     (2006.01)
    *G06K 7/10*     (2006.01)
    *G06K 7/14*     (2006.01)
    *G06F 17/30*     (2006.01)

(52) U.S. Cl.
    CPC ......... *G06K 7/1417* (2013.01); *G06K 7/1443* (2013.01); *G06K 7/1452* (2013.01); *G06K 7/1456* (2013.01); *G06K 7/1473* (2013.01); *G06K 19/06037* (2013.01); *G06Q 30/018* (2013.01)

(56) References Cited

U.S. PATENT DOCUMENTS

| | | |
|---|---|---|
| 4,837,840 A | 6/1989 | Goldman |
| 5,521,984 A | 5/1996 | Denenberg et al. |
| 6,244,764 B1 | 6/2001 | Lei et al. |
| 6,550,685 B1 | 4/2003 | Kindberg |
| 7,080,041 B2 | 7/2006 | Nagel |
| 7,089,420 B1 | 8/2006 | Durst et al. |
| 7,492,920 B2 | 2/2009 | Jordan et al. |
| 7,533,062 B2 | 5/2009 | Sanchez et al. |
| 7,599,544 B2 | 10/2009 | Moshe |
| 7,684,088 B2 | 3/2010 | Jordan et al. |
| 7,965,862 B2 | 6/2011 | Jordan et al. |
| 2005/0047593 A1 | 3/2005 | Hampp |
| 2006/0109515 A1 | 5/2006 | Zhao et al. |
| 2008/0164328 A1 | 7/2008 | Burn |
| 2008/0197203 A1 | 8/2008 | Wirnitzer et al. |
| 2010/0027851 A1 | 2/2010 | Walther et al. |
| 2010/0086173 A1 | 4/2010 | Berger et al. |
| 2012/0263343 A1 | 10/2012 | Simske et al. |
| 2015/0083801 A1* | 3/2015 | Soborski .......... G06K 19/06056 235/375 |
| 2015/0205984 A1* | 7/2015 | Jiang .................... G06K 19/08 235/437 |

FOREIGN PATENT DOCUMENTS

| | | |
|---|---|---|
| DE | 10 2008 007 731 A1 | 8/2009 |
| EP | 1 319 291 A1 | 6/2003 |
| EP | 1 690 697 A1 | 8/2006 |
| EP | 1 433 305 B1 | 11/2008 |
| EP | 1 319 219 B1 | 11/2010 |
| EP | 1 514 227 B1 | 6/2013 |
| WO | WO 01/53101 A1 | 7/2001 |
| WO | WO 02/15506 A1 | 2/2002 |
| WO | WO 2006/013037 A1 | 2/2006 |
| WO | WO 2007/072044 A1 | 6/2007 |
| WO | WO 2008/059017 A1 | 5/2008 |
| WO | WO 2010/070345 A1 | 6/2010 |
| WO | WO 2013/130946 A1 | 9/2013 |

OTHER PUBLICATIONS

Bulan et al., Geometric Distortion Signatures for Printer Identification, Acoustics, Speech and Signal Processing, Apr. 19, 2009, pp. 1401-1404, ICASSP 2009, IEEE, Piscataway, NJ, US.

* cited by examiner

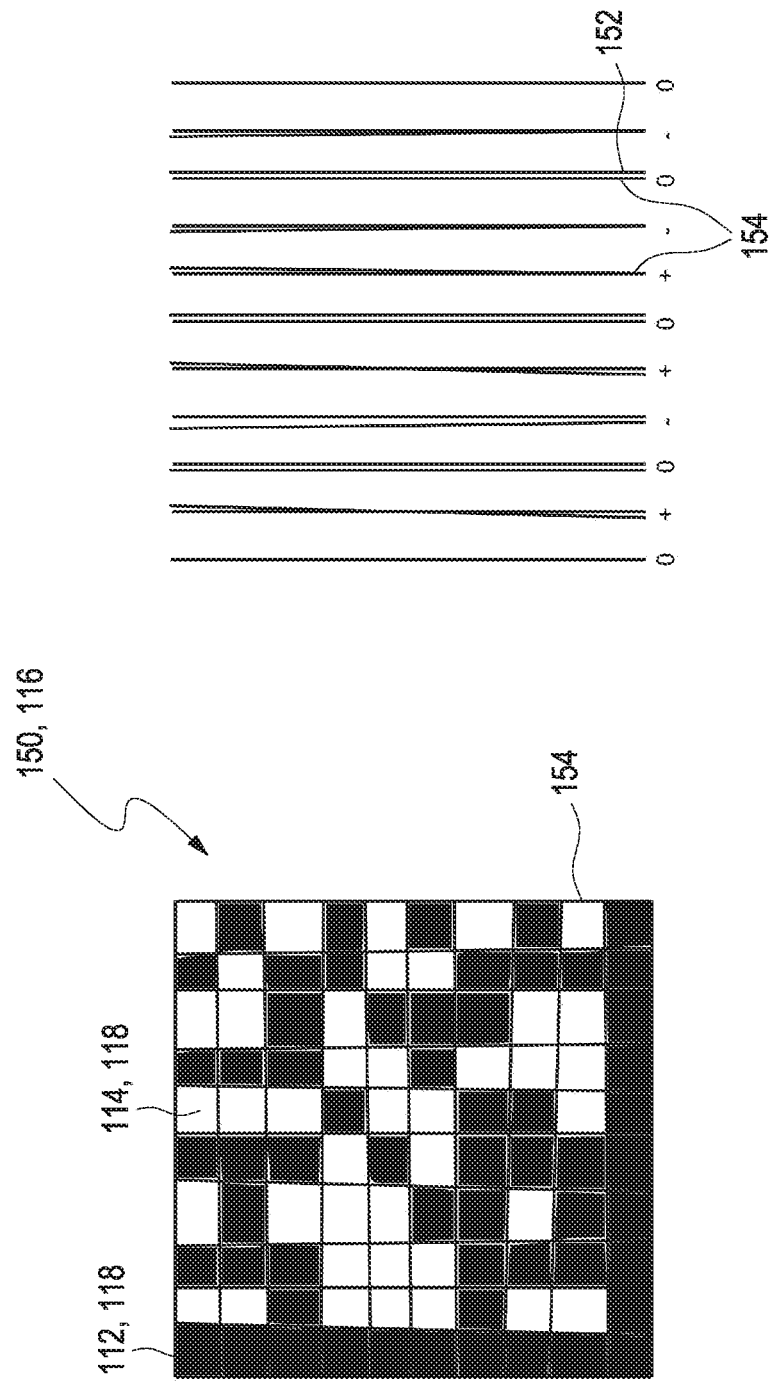

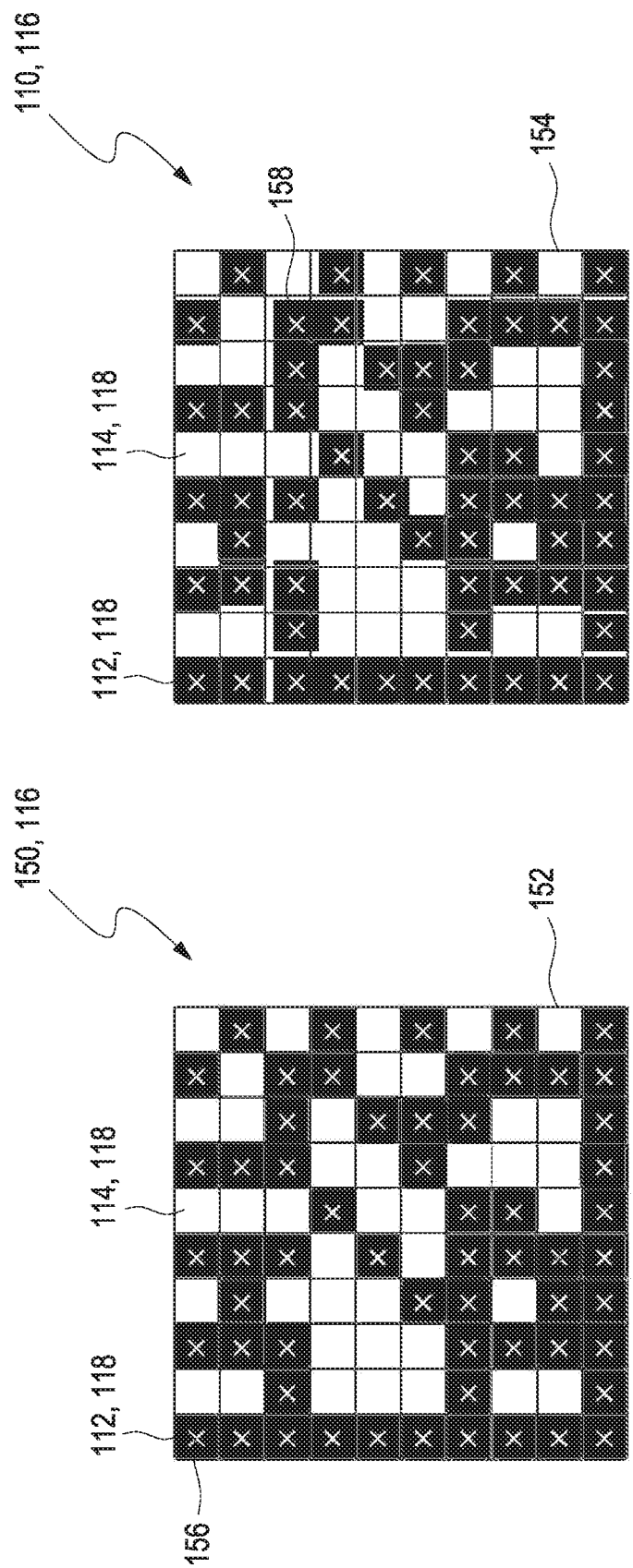

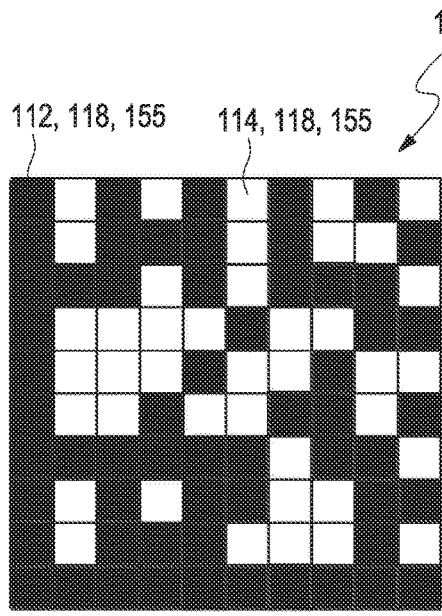
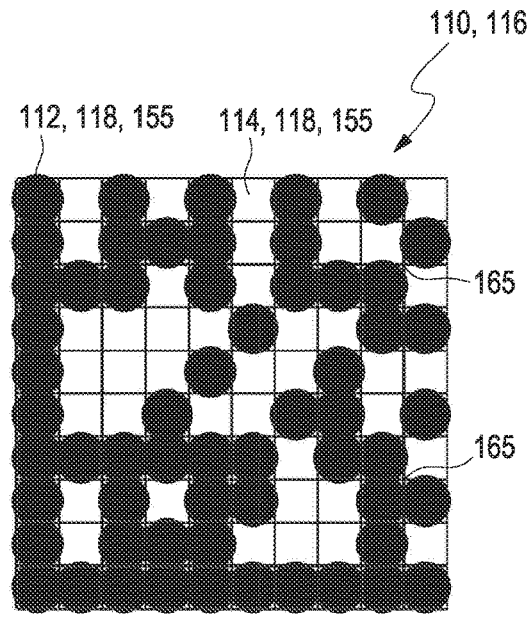
Fig. 10 A          Fig. 10 B
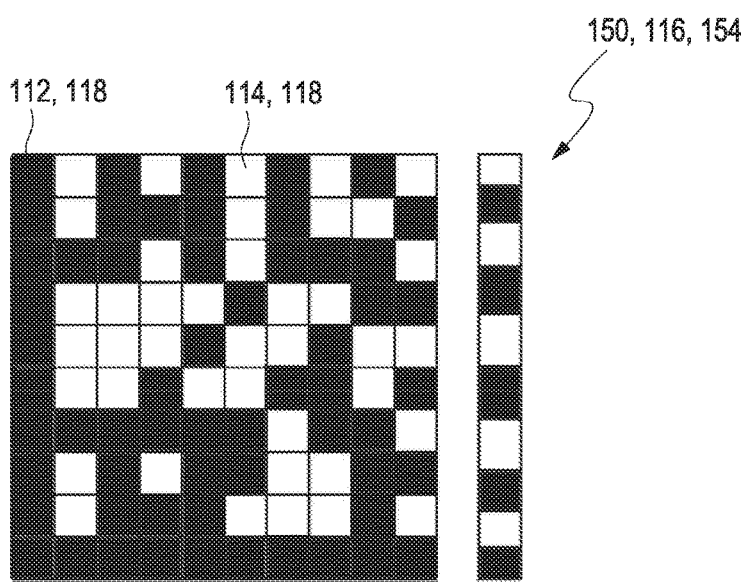
Fig. 11 A

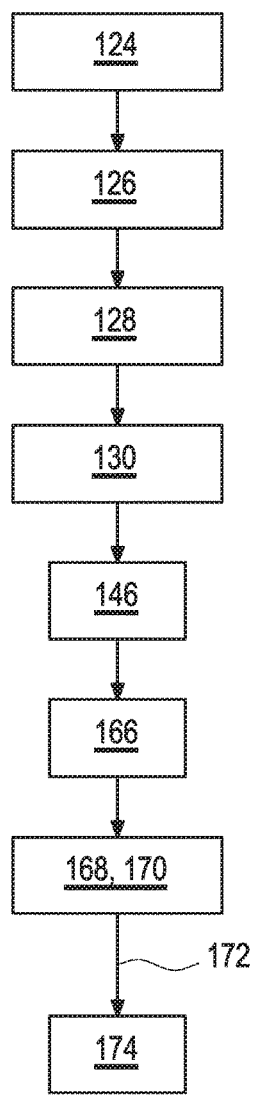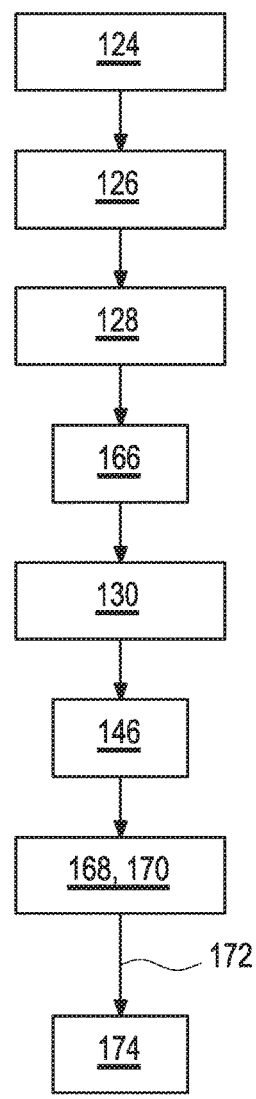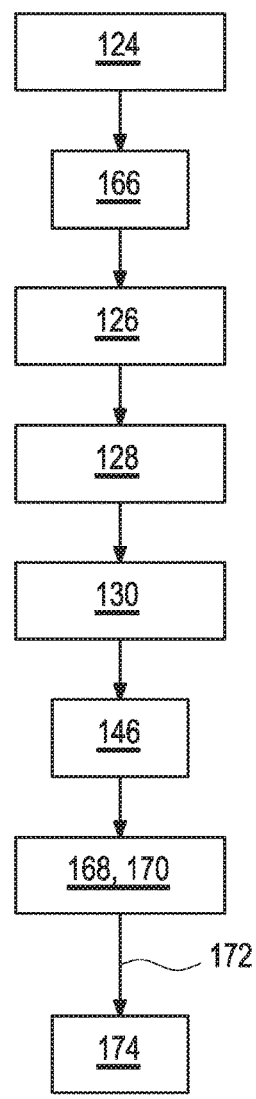
Fig. 15 A
Fig. 15 B
Fig. 15 C

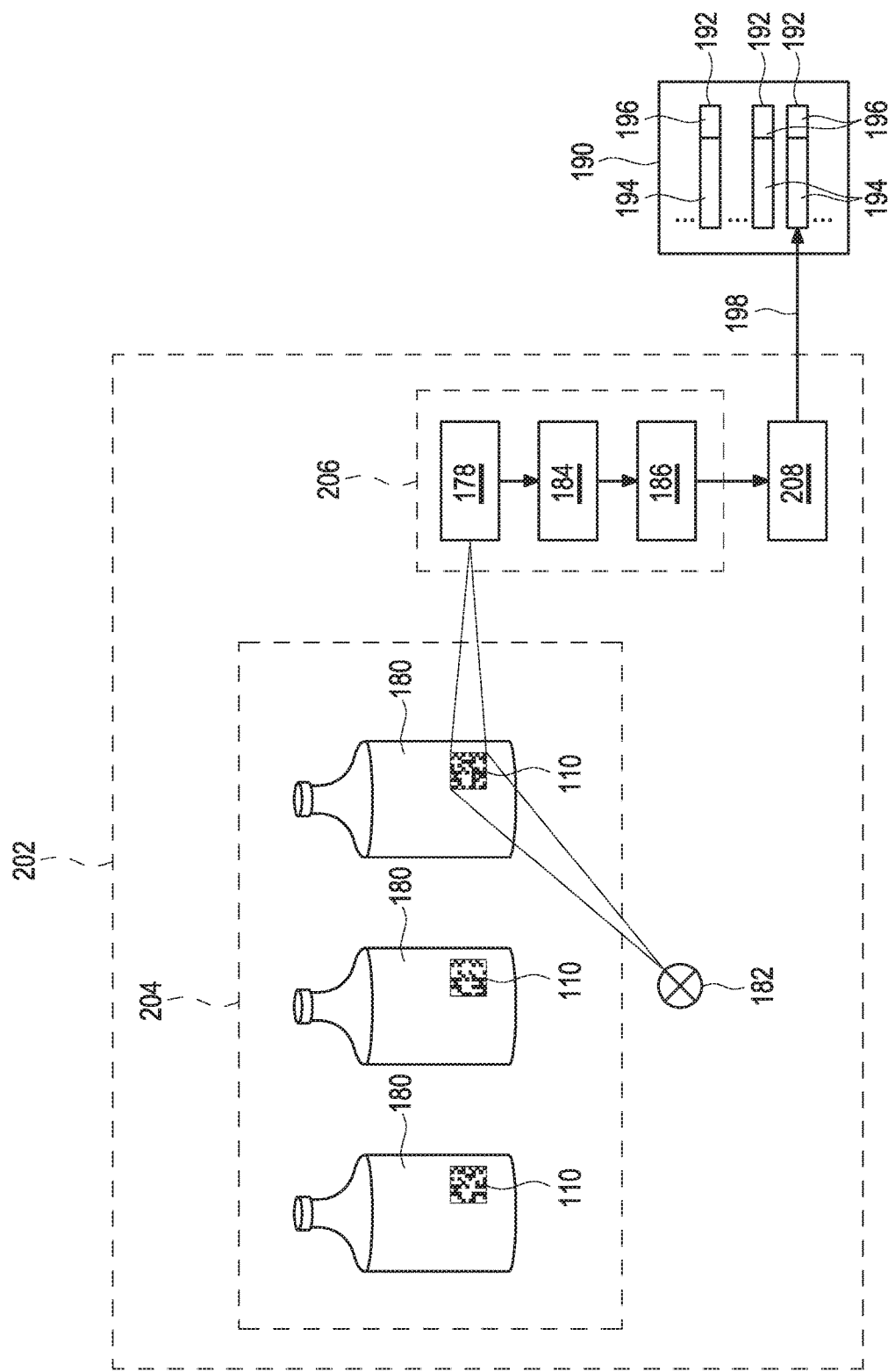

METHOD AND APPARATUS FOR PROVING AN AUTHENTICATION OF AN ORIGINAL ITEM AND METHOD AND APPARATUS FOR DETERMINING AN AUTHENTICATION STATUS OF A SUSPECT ITEM

CROSS REFERENCE TO RELATED APPLICATIONS

This is a continuation of application serial no. PCT/EP2015/052046 filed Feb. 2, 2015 which claims priority from EP 14 153 785.2 filed Feb. 4, 2014 and from EP 14 185 775.5 filed Sep. 22, 2014 the disclosures of all three of which are hereby incorporated by reference.

BACKGROUND

1. Technical Field

The present disclosure relates to a method, an apparatus and a use of an apparatus for proving an authentication of an original item as well as to a hereto related method and apparatus for determining an authentication status of a suspect item. The disclosure further relates to a computer program for performing the mentioned methods as well as to a data carrier having a data structure stored thereon, which, after loading into a computer or a computer network, is capable of executing the methods.

2. Description of the Related Art

The proof of the authentication of an original item as well as the determination of the authentication status of a suspect item based on an evaluation of material structures and/or production tolerances is a well-known technology which has been largely developed during the last decades. The basic methods in this field have been triggered by the authentication proof and determination of bank notes, commercial papers and/or security documents. Within this regard, a number of authentication methods and devices have been described which mainly rely on a recognition of unique features emerging during a production process in order to be able to determine the authentication status of a suspect item. These kinds of technologies are usually based on the observation that a substrate, such as a paper or a cardboard, due to its organic and anisotropic material structure, generally absorbs inks locally in an individual manner, by which process non-reproducible patterns may evolve throughout the area wherein the ink is absorbed, particularly at the margins of such areas.

The first concepts for determining these kinds of structures, however, had to struggle with various barriers which mainly concerned the processing and storing of data related to the authentication status. For example, as described in U.S. Pat. No. 4,423,415; U.S. Pat. No. 4,811,408, and U.S. Pat. No. 4,837,840; patterns determined from such unique structures were generally printed on the documents themselves in the form of a barcode and/or stored in a magnetic memory which forms part of the respective document. However, both the technological barriers concerning the reproducibility of the recognition of unique features as well as the insufficient storing capabilities led to a security problem which complicated the generation of authenticatable documents.

U.S. Pat. No. 5,521,984 discloses a method for determining an authentication status of a suspect item particularly applicable to objects of fine art, including limited edition prints, and which is based on the uniqueness of actions involved in the creation of such an object, e.g. a brush stroke exerted by an artist. Hereby, the authentication of the original item is determined by recording at a microscopic level a unique pattern of such a feature at a selected microsite of the original item which is subsequently stored in a central data storage from which it can be retrieved over a communication link upon request and compared with an actually recorded picture of the same microsite of the suspect item.

Particularly owing to the considerable developments in the fields of imaging and storing technologies, various advanced systems which are capable of the recognition of structures have been proposed. Within this regard, devices for the generation of hardly reproducible print images have been introduced, which make use of principle of lossy reproduction in order to enable a determination of the authentication status of a document (see, e.g. EP 1319291 B1, EP 1514227 B1, WO 2006/013037 A1, US 2010/0027851 A1, U.S. Pat. No. 7,080,041 B2). Herein, deviations within the print images are recognized on a micro-scale and stored for retrieving and comparing within a further authentication process. In general, the storing takes place in a database which comprises the various print images and/or information related to their specific uniqueness. As a result, this kind of procedure generates large databases which have to be searched completely during an authentication process. In order to achieve a high reliability of the authentication process, on one hand, an acquisition of print images with a high resolution is required and, on the other hand, large efforts are needed in order to allow a rapid browsing of the database. As an alternative, U.S. Pat. No. 6,550,685 B1 therefore proposes to extract unique features from the print image and print it separately in the form of a code onto the same item.

A further example may be found in WO 2013/130946 A1, wherein natural variations in marked features on an item, such as a barcode oriented onto the item, are assessed with respect to artifacts which are specific to the item. For this purpose, information associated with the artifacts is extracted, whereupon the information is ranked according to characteristics of the artifacts, in particular by calculating an autocorrelation series of the ranked information. Hereby, ranking includes treating artifacts with a characteristic below a threshold differently from artifacts above the threshold, such as not ranking artifacts smaller than the threshold, or grouping artifacts together with locations where no artifact is detected, or discounting artifacts. Thereafter, the ranked information or data representing the autocorrelation series are stored in a storage device separate from the original item.

Various devices and methods employ laser systems which are primarily used in order to record not the printed documents themselves but rather the irregularities within the substrate materials utilized to carry the printed information (see, e.g. DE 101 55 780 A1, DE 101 62 537 A1, U.S. Pat. No. 7,089,420 B1, WO 2007/072044 A1, WO 2008/059017 A1, U.S. Pat. No. 7,599,544 B2, WO 2010/070345 A1).

Other known methods make use of already existing print images or invisible marks on the object (see, e.g. EP 1319219 B1, EP 1 433 305 B1, EP 1 690 697 A1). Within this regard, irregularities which occur during a printing process on a micro-scale, particularly through a dispersion of inks, by vibrations of the printing equipment, or through other effects such as partially blocked nozzles, are employed in the authentication process. As an example, DE 10 2008 007731 A1 and U.S. Pat. No. 7,533,062 B2 describe a method and a device for authenticating items by carefully recording the margins of printed areas from which an identifiable signature is determined which is used for further authentication of the suspect item.

O. Bulan and G. Sharma, *High Capacity Color Barcodes: Per Channel Data Encoding via Orientation Modulation in Elliptical Dot Arrays*, IEEE Transactions on Image Processing, Vol. 20, pp. 1337-1350, 2011, present a new high capacity color barcode. The barcode uses the cyan, magenta, and yellow (C, M, Y) colorant separations available in color printers and enables high capacity by independently encoding data in each of these separations. In each colorant channel, payload data is conveyed by using a periodic array of elliptically shaped dots whose individual orientations are modulated to encode the data. The orientation based data encoding provides beneficial robustness against printer and scanner tone variations. The overall color barcode is obtained when these color separations are printed in overlay as is common in color printing. A reader recovers the barcode data from a conventional color scan of the barcode, using red, green, and blue (R, G, B) channels complementary, respectively, to the print C, M, and Y channels. For each channel, first the periodic arrangement of dots is exploited at the reader to enable synchronization by compensating for both global rotation and scaling in scanning and local distortion in printing. To overcome the color interference resulting from colorant absorptions in non-complementary scanner channels, a novel interference minimizing data encoding approach and a statistical channel model (at the reader) that captures the characteristics of the interference are proposed, enabling more accurate data recovery. Further, an error correction methodology that effectively utilizes the channel model is employed.

O. Bulan, J. Mao, and G. Sharma, *Geometric distortion signatures for printer identification*, 2009 IEEE International Conference on Acoustics, Speech and Signal Processing, pp. 1401-1404, 2009, present a forensic technique for analyzing a printed image in order to trace the originating printer. This method, which is applicable for commonly used electro-photographic (EP) printers, operates by exploiting the geometric distortion that these devices inevitably introduced in the printing process. In the proposed method, first a geometric distortion signature is estimated for an EP printer. This estimate is obtained using only the images printed on the printer and without access to the internal printer controls. Once a database of printer signatures is available, the printer utilized to print a test image is identified by computing the geometric distortion signature from test image and correlating the computes signatures against the printer signatures in the database. Experiments conducted over a corpus of EP printers demonstrate that the geometric distortion signatures of test documents exhibit high correlation with the corresponding printer signatures and a low correlation with other printer signatures.

Although various methods and devices for determining the authentication status of a suspect item have been proposed, still, a number of problems and obstacles exist which particularly impede their industrial implementation on a larger scale. Within this regard, a major issue relates to the resolution of optical systems which are employed in the acquisition of print images such as one- or two-dimensional barcodes. In order to assess the irregularities at the margins of a print image, an optical system with a resolution and a magnification being at least comparable to the size of the print irregularities is required. As a result, however, an optical system comprising both a high resolution and a high magnification must be employed. As an example, the modules of a two-dimensional barcode, such as a data matrix barcode, are usually decoded in industrial facilities by employing an optical system which comprises a resolution of 5 pixels per dimension. However, in order to resolve the margins of the modules of the barcode with sufficient resolution, 40 pixels per dimension are needed. However, this requirement which increases the resolution of the optical system by a factor of 8 in each dimension leads to an increase of the data volume to be further processed by a factor of 64. Consequently, the requirements on the optical system as well as on the data storage system are multiplied in a system which is configured for assessing margins of a print image compared to a device being adapted for simply decoding a two-dimensional barcode. As a result, devices which are already installed for the decoding of barcodes do not exhibit a sufficient resolution which would allow employing such devices for the recognition of irregularities in the margins of a print image at the same time. In other words, existing optical systems have to be upgraded in order to be able to perform a margin analysis of print images within the determination of the authentication status of a suspect item.

In addition, such methods and devices for determining the authentication status of a suspect item require a high sharpness of the print image. Together with the high resolutions and, additionally, high processing speeds, which could be up to 2000 recordings per minute, very short exposure times are required in order to record pictures which exhibit only a slide motion blurring, particularly in a range below two pixels. Comparing these requirements with known decoding systems for barcodes which employ an exposure time of approximately 1:8 000 s, an exposure time of 1:80 000 s would be necessary. This would require a high illumination which is rather sophisticated and lead to a large heat generation which could heat up the object to intolerable values. Consequently, methods and devices for determining the authentication status of a suspect item which are based on margin recognition are currently not compatible with the requirements in industrial facilities.

SUMMARY

The present disclosure describes a method and an apparatus for proving an authentication of an original item as well as a hereto related method, apparatus and use of the apparatus for determining an authentication status of a suspect item, which at least partially overcome the problems and shortcomings of such methods and devices known from the state of the art.

The present disclosure also describes a method and an apparatus for determining an authentication status of a suspect item which may readily be employed within new or existing industrial facilities comprising optical systems, particularly within the pharmaceutical industry, where barcodes are printed onto the items for serializing single products. For this task it may be desirable to be able to employ optical systems which would require a comparatively low resolution of approx. 5 pixels per module, thus requiring less effort and fewer adaptions to known systems and procedures which would facilitate their implementation.

The present disclosure further describes a method for determining the authentication status of a suspect item which could be employed within industrial facilities for a fast and still reliable authenticating of a plurality of items, particularly by making use of existing recording devices which could be already adapted for recording print images with speeds and typically low resolutions, such as approx. 5 pixels per module, as generally employed within industrial facilities. Hereby, it should be taken into account that such facilities are designed to record up to 2,000 or more pictures per minute, which would mean that the present method should be able to be performed at a speed much faster than any other known authentication method.

The present disclosure also describes a method for determining the authentication status of a suspect item which could reduce the requirements for a discriminability of authentication data and, at the same time, decrease the possibility of false-positive or a false-negative identifications.

A method and an apparatus for proving an authentication of an original item and/or for determining an authentication status of a suspect item, a computer program for performing the methods described herein and by a data carrier having a data structure stored thereon, which, after loading into a computer or computer network, is capable of executing the methods described herein are described herein. Various embodiments, which might be realized in an isolated fashion or in any arbitrary combination thereof are also provided by the present disclosure.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, as used in the following, the terms "preferably", "more preferably", "particularly", "more particularly" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the feasibility of combining the features introduced in such way with other optional or non-optional features of the invention.

Since the present disclosure refers to a number of different aspects which are, however, closely related to each other, an initial overview over the various aspects of the present disclosure as well as their mutual relationship will be given.

First, a method and an apparatus for proving an authentication of an original item are applied in order to generate an individual imperfection profile related to the original item which may later be authenticated as a suspect item. For this purpose, the individual imperfection profile is stored by printing it onto the original item and/or by keeping it in a database record for later reference. Hereby, the method for proving the authentication of the original item comprises at least steps i) to iv), whereas an apparatus for proving the authentication of the original item at least comprises parts I.) to IV.).

Second, a method and an apparatus for determining an authentication status of a suspect item are applied in order to determine the authentication status of the suspect item under investigation. For this purpose, the individual imperfection profile related to the suspect item is compared with the imperfection profile related to the original item. Hereby, the method for determining the authentication status of the suspect item comprises at least steps a) to d), whereas an authentication apparatus at least comprises parts A) to D). In addition, a use of the authentication apparatus is disclosed for particularly preferred items.

Since any of the methods described herein may at least partially be performed using a computer-related implementation, a computer program including computer-executable instructions as well as a data carrier having a data structure stored thereon comprise further aspects of some embodiments disclosed herein.

In a first aspect, the present disclosure relates to a method for proving an authentication of an original item. As already described above, the present method comprises the following steps step i) to iv). The steps i) to iv) are preferably performed in the given order, still, other orders may be feasible. Further, it may be feasible to perform two or more of the steps simultaneously or in an overlapping fashion. Further, it may also be feasible to perform one, two or more of the steps repeatedly, not depending on the fact whether other steps may be equally repeated. Further, additional steps may be comprised which are not mentioned in the following.

According to the present disclosure, the "item", i.e. the original or the suspect item, may be any physical object to which a code, as defined further below, is assigned to. Hereby, it is of no particular relevance whether the item itself may be of any value or whether the item, such as a document or a packaging, refers to or comprises another item which may be of some value, either in a commercial view, a personal view, or any other view. Within a first regard, a printed version of the code may thus be placed directly on the surface of the item. However, in a number of cases the printed version of the code may preferably not be printed onto the item itself but on a packaging of any kind which comprises the item. First, the item itself may be of a consistence, such as a gel, a liquid, a gas, or of any other form which may not exhibit a steady solid form, that a particular kind of packaging may be required for storing, transporting, trading, and any other action referring to the item. Second, the surface of the item may not allow the consistent placing of the printed version of the code, e.g. in a case where the surface is too rough or too impermanent for consistently carrying the printed version of the code. Third, the item may be furnished with any kind of packaging, for example, for any commercial or trading reason, such as for improving the storability, the durability, the stability, or the keeping properties of an item, for equipping the item with a packaging which comprises a specific style or design, particularly for transport or storage reasons, or for improving the optical appearance of the item such as for esthetic or trading reasons. Fourth, there may also be legal or statutory reasons which may require the item to be furnished with a packaging, such as for medical drugs. Particularly within the pharmaceutical industry, but not limited thereto, each substance which may comprise, within a first respect, a solid body, such as a powder, a pill, a tablet, or a preparation, within a second respect, a liquid, such as a liquid formulation, an emulsion, or a serum, or, within a third respect, a gas, such as an aerosol, are comprised in at least in one packaging, which may further be comprised itself in at least one additional packaging, which is usually referred to as "outer packaging".

As further used herein, the "item" may, thus, refer to the physical object itself, to a label, a document, or any other article which may accompany the physical object, or to at least the one packaging which may comprise the physical object. Consequently, the item may not only be selected from the physical object itself but also from an accompanying article or from any other object which may be employed as the primary packaging for the physical object, such as a bottle, a syringe, a vial, an ampoule, a carpule, a blister, and/or a secondary packaging such as a cardboard box, a folding box, a hangtag, or any other outer packaging such as a plurality of folding boxes wrapped with plastic foil, called a bundle or a shipping carton, or a container. Within this regard, it is of no relevance whether the packing completely or only partially encloses the object. Thus, both the method for proving the authentication of the original item as well as the method for determining the authentication status of the suspect item may be applied under circumstances, wherein the physical object and/or an article accompanying the physical object and/or at least one packaging comprising the physical object may be proved or investigated with respect to the authenticity of the physical item and/or of the accompanying article and/or of the at least one packaging comprising the physical object. Within this regard, it may be feasible to analyze a picture of the printed version of the code which is printed on the object and/or on an article accompanying the physical object, and/or on a packaging, either on the primary packaging and/or on the secondary packaging comprising the physical object, and prove the authentication of the original item or draw conclusions, by such investigating, about the authenticity of the suspect item, which may be the physical object and/or the article accompanying the physical object and/or the packaging comprising the physical object. With respect to any of the methods, it may be feasible to prove the authentication of the original item or determine the authentication status of the suspect item as long as the printed version of the code which is assigned to the item is printed onto the physical object and/or the accompanying article and/or the packaging comprising the physical object. In addition, any of the methods may also be applied in a case where the printed version of the code is printed on both the primary packaging which comprises the physical object and the secondary packaging which comprises the primary packaging in order to determine the authentication status of the physical object itself, of the primary packaging and/or of the secondary packaging, such as at the same time. Such a procedure might be of particular relevance in situations where product safety and the way of transport must be ensured.

As further used herein, the item may be considered as the "original item" as long as the item itself or a part thereof or a code, as will be defined further below, assigned to the item or a part thereof may be genuine and comprise no replica. In contrast hereto, a "suspect item" may be considered as an item which may not be identical with the original item but be or comprise a counterfeit item which may allegedly create an impression as being identical to the original item. On one hand, the impression might be based on any evidence that the suspect item may differ with respect to any property from the original item, wherein such evidence may issue from a slightly different property of the suspect item, such as with respect to size, color, texture, or weight, among other corresponding properties, with respect to the known original item. On the other hand, the counterfeit may be accomplished in a quality that the suspect item may not show any such evidence which would make it distinguishable from the original item in this way. Consequently, a suspect item might be one of a group consisting of the original item and of the counterfeit item.

As further used herein, the "code" may be defined as a machine-readable representation of data which are assigned to the item to which the printed version of the code is attached. In particular, the readability of the data by machine distinguishes the code from any other representation of data which relate to the item, such as printing the data in human readable form. However, although a code may be read both by machine and by human beings, it may still be considered as a code according to the present invention as long as it can be recorded by machine. Hereby, for each code a set of rules exists which allows generating a specific code being assigned to a specific item upon providing specific data which are related to the specific item. Such an application of the set of rules allows generating a code, such as a linear or a one-dimensional barcode which generally represents data by varying the width and spacings of parallel lines, or a two-dimensional barcode which might represent data within an arrangement of bars, rectangles, squares, hexagons, or any other geometric pattern being distributed over a limited two-dimensional area, or a dot code which might comprise a specific number of dots also distributed over a limited two-dimensional area. Preferably, the set of rules which allows generating the code to be assigned to the suspect item may be retrieved from a standard specification being laid out to define the code. World-wide, various standard specifications are used nowadays, however, with regard to the present disclosure the standard specification may preferentially be selected from the group consisting of:

a data matrix barcode, as defined according to ISO/IEC 16022;

a QR barcode, as defined according to ISO/IEC 18004; and/or a linear barcode 128, as defined according to ISO/IEC 15417.

However, other standard or non-standard specifications being configured to provide the set of rules which allows generating a code being adapted to perform any of the methods according to the present disclosure may also be employed.

A code which may particularly be feasible to be used with regard to the present invention may comprise a plurality of modules, preferably at least 30 modules, more preferably at least 100 modules, most preferably at least 200 modules. As further used herein, the module of the code may be defined as the smallest unit within the code which may be able to represent data in a manner that such data may be optically read by a machine. In a particularly preferred embodiment, a module may thus comprise a binary field, such as a bar, a rectangle, a round dot, an oval dot, a square, or a hexagon, the area of which geometrical pattern is filled with a specific color which can be optically distinguished by the employed machine from neighboring modules surrounding a specific module. For simplicity, each module may either comprise a black area, a white area, or an area in a specific color, or the opposite filling thereof, i.e. a white area, a black area, or a colored area in a different, preferably a complementary color with respect to the specific color. As a result, by applying the set of rules the plurality of modules may be arranged in the form of an ideal image as a graphic representation of the code. As an example, in a one-dimensional code the modules may be arranged one after the other in a line within the code whereas, in a two-dimensional code, the code may, thus, also be described as a two-dimensional matrix which may consist of rows and lines of modules.

Hereby, the main purpose of the code is to encode data which are assigned to the original item in a manner that at least one barcode content of the item is encoded within the plurality of modules, wherein the "barcode content" may allow establishing a specific relationship between the item and the representation of the item within the code. As further used herein, the barcode content may preferably comprise a numeric or an alphanumeric value being related to the item in a unique way. In other words, knowing a specific barcode content will allow identifying the specific item which is related to the specific barcode content by application of the set of rules according to which the code has been generated. On the other hand, knowing a specific code will allow to decoding the specific barcode content for the specific item which is related to the specific barcode content again by applying the set of rules as applied in the generation of the specific barcode content.

According to a further embodiment, the printed version of the code is printed onto the original item. Hereby, the printing of the code onto the original item is performed with an original printing device which may apply any known printing technology, such as cartridge, continuous or "drop on demand" inkjet technologies, laser printing, thermo transfer printing, digital printing, etc. Consequently, each printing technology as applied by the original printing device may leave a kind of fingerprint resulting from printing the printed version of the code onto the original item. In addition, although applying the identical printing technology, the code as printed by using two different printing devices may still be distinguishable due to unique features which may be inherently related to a specific printing device, such as caused by manufacturing tolerances and/or age symptoms, and/or which may depend on a specific setting of the printing device, such as a contrast, or a printing speed, among others. As a result, the printed version of the code generally differs from the ideal image of the plurality of modules as generated by applying the set of rules related to the code, whereby a numerical value for this kind of difference will be denoted as "individual imperfection profile" of the original printing device. In practice, it may turn out to be virtually impossible to generate two identical printed versions of the same ideal image based on the same code. Consequently, the present invention may particularly allow distinguishing between the original printing device as being used in printing the code onto the original item and a different printing device that may be employed in printing the same code onto a counterfeit item by using the individual imperfection profile of the original printing device.

According to step i) of the method for proving the authentication of the original object, at least one picture of the printed version of the code printed onto the item is recorded by means of an optical system. As explained above, the present disclosure makes use of the fact that the printed version of the code as actually printed onto the item generally differs from the ideal image as generated by the set of rules for the corresponding code. The reasons for this difference are manifold but well-known. Among others, the main contributions may arise from vibrations of the infrastructure, particularly from the printing machine, from a variable viscosity of the inks involved, from the humidity of the ambient atmosphere, from the permeability of the nozzles, or from irregularities of the substrate material which may form the area of the surface of the item at which the printed version of the code may be located. Hereby, the mentioned difference between the ideal representation of the code in the ideal image and the printed version of the code as actually printed on the item constitutes the basis for any of the methods according to the present invention.

As further used herein, the "picture" may comprise an optical image of the printed version of the code as being recorded by the optical system. Hereby, the picture may describe a one- or two-dimensional representation comprising a number of pixels in each dimension which together form the picture of the printed version of the code, thus constituting a basis for a further evaluation of the picture in order to extract the data relating to the item comprised within the code. For performing this task, various mechanisms have been introduced to ensure a readability of the code, in particularly with regard to the symmetry and the contrast of the modules. According to the state of the art, the optical system being used for performing this task requires, for practical reasons, a comparatively low resolution of about 5 pixels per module and per dimension. Thus, the optical system which is configured for performing any of the methods according to the present invention may preferably comprise a resolution of 20 pixels per module per dimension or less, such as 3 to 15 pixels per module and per dimension, preferably 4 to 10 pixels per module per dimension, most preferably 5 pixels per module and per dimension. As further used herein, the "resolution" may refer to the ability of the optical system to resolve the mentioned number of pixels within the modules of the printed version of the code as printed onto the item.

In a preferred embodiment, the optical system employed for performing any of the methods according to the present invention may comprise at least one element which may be selected from the group consisting of: a flatbed scanner, a camera, a barcode hand-scanning device, a cell or a cellular phone, a laptop webcam, a smartphone, a tablet computer. However, any other optical system comprising a resolution which may be sufficient to resolve the modules in the printed version of the code may also be used.

In a further preferred embodiment, the mentioned step i) may comprise at least one of the following sub-steps i1) to i4).

According to sub-step i1), the picture of the printed version of the code may be located within a larger picture taken by the optical system, whereby the larger picture may not only comprise the picture of the printed version of the code but additional features. Hereby, the larger picture of at least a part of the item may be taken in which the picture of the printed version of the code may be localized and defined, for example, through its coordinates of other specifications with regard to the position and/or rotation of the picture.

In addition, or as an alternative, to one or more of sub-steps i1), or i4), and particularly in order to extract the picture of the printed version of the code from the larger picture, the sub-steps i2) and/or i3) may be applied. According to sub-step i2), the picture may be rearranged with respect to a spatial orientation within the larger picture whereas, according to sub-step i3), the larger picture may be cut or cropped at least at one side and/or at one edge by which sub-steps i2) and/or i3) the picture of the printed version of the code itself may be acquired without the additional features which might be able to disturb the further processing of the picture. As further used herein, the rearranging of the spatial orientation of the picture may comprise at least one tilting step by which the at least one axis of the picture is aligned with a usually linear orientation (in one dimension) or with a usually rectangular orientation (in two dimensions) of the code. In the case of two dimensions, the two-dimensional picture may comprise two axes being lines crossing each other, thereby creating an angle with respect to each other, wherein the angle might preferably take a value of 90°, whereby, however, other values of the angle may be possible. As further used herein, the cutting of the picture may include a cutting step or cropping step during which a part of the features within the picture are removed from the larger picture usually along at least one straight line which discriminates the respective parts.

In addition, or as an alternative, to one or more of sub-steps i1), i2), or i3), sub-step i4) may be performed. According to sub-step i4), the picture of the printed version of the code may be transformed into a binary format. Using this transforming step, the information comprised within the picture may generally be reduced in a manner that a specific module within the picture may only take one of two values of a Boolean variable, such as TRUE or FALSE, 1 or 0, black or white, or any other suitable designation.

According to step ii), the at least one barcode content is decoded from the picture of the printed version of the code according to the set of rules as defined above. Hereby, the decoding may be performed on the picture of the printed version as recorded by the optical system and/or from the picture which has been further modified by any one or more of the sub-steps i1) to i4) or any further or subsequent sub-step. As a result of performing step b), the at least one barcode content which is related to the item has been acquired.

According to step iii), irregularities in the picture the printed version of the code are analyzed by identifying at least one deviation in the picture with respect to the ideal image and, further, a numerical value which describes an individual imperfection profile of the original printing device is calculated. Within this regard, it is mentioned that this step may allow uniquely identifying a given code, wherein at least one deviation may be created in the picture the printed version of the code during the printing process. However, a particular printed version of the code on a particular item may not necessarily comprise all possible deviations but, in practice, may only exhibit a selected number thereof which may be observed during the analyzing step iii). The methods according to the present invention are, thus, based on the reasonable assumption that a sum of the observed deviations in the particular printed version of the code on the particular item may be unique in a manner that any other printed version of the code may not be able to reproduce exactly the same deviations. As a result, the calculating of the numerical value of the individual imperfection profile, thus, depends on at least one unique feature inherently related to the printing device used for printing the particular printed version of the code on the particular item, wherein the at least one unique feature is selected from at least one of a printing technology and a setting of the printing device.

Consequently, analyzing step iii) may particularly ensure that irregularities which may be comprised within the printed version of the code may have actually been generated by the original printing device actually applied in printing the printed version. The analyzing step iii) may, thus, be able to detect a possible bypassing of the present method which may, for example, be performed by copying the code through high-resolution printing technology, such as offset printing. As an example, the printed version of the code could be copied by a high-resolution printing technology which may include copying the irregularities which may otherwise be produced arbitrarily by a low-resolution printing technique. If such an observation may be detected during the identifying step, the authentication status of the item, as further described below, may be determined as FALSE or 0 since the printed version of the code may have been printed by a different printing device, by which observation the conclusion may be drawn that the code may be a counterfeit, which means that due to the fact that the code is uniquely assigned to the item, the item may also be considered as a counterfeit.

Similar to the deriving of the at least one barcode content of the item according to step ii), the analyzing step iii) may be performed on the raw version of the picture of the printed version of the code as recorded by the optical system and/or by using the picture in a modified way, in particularly by applying one or more of the sub-steps i1) to i4) and/or any other modifying step with relation to the picture as recorded by the optical system. Hereby, both the procedures according to step ii) and the procedures according to step iii) may be performed on the same picture. As further used herein, the "same picture" may include the identical picture, an original picture recorded by the optical system and a picture modified according to the above-mentioned ways, two pictures which each may be modified in a different manner according to the above-mentioned ways, two subsequent exposures of the same printed version of the code by the same optical system, particularly within a short period of time, or any combination thereof.

In general, it may be possible to employ a number of rules as defined in the standard ISO/IEC 16022 data matrix bar code symbology specification in order to analyze deviations between the picture of the printed version of a data matrix code with respect to the code in the ideal data matrix image. However, since this and other standard have been generated for other purposes, they may not provide optimal results when being employed within the methods according to the present invention. Whereas such kinds of standards usually comprise procedures for dealing with errors which occur in a representation of the code, the present method employs the naturally occurring errors for determining an authentication status of a suspect item. Therefore, it may particularly be advantageous for the purposes of the present disclosure that the analyzing step iii) may comprise any or all of the sub-steps iii1) to iii7). Hereby, a number of the sub-steps iii1) to iii7) may be selected for calculating the numerical value of the individual imperfection profile, wherein the selected number of the sub-steps iii1) to iii7) may depend on at least one of the printing technology and the setting of the printing device. The selected sub-steps may be performed in the given order or in any other feasible order, as the skilled person will recognize. Further, two or more of the selected sub-steps may be performed in parallel or at least partially simultaneously. Further, one, two or all of the selected sub-steps may fully or partially be performed once or several times, i.e. repeatedly. Hereby, it is mentioned that the readability of barcodes may generally not be impaired by errors occurring within a module. Therefore, in case any errors may occur which might impede the readability of the code in a serious manner, they may be excluded from the analyzing step iii). However, step iii) may particularly concentrate on errors which randomly occur within the picture of the printed version of the code under investigation.

According to sub-step iii1), for at least one module in the picture of the printed version of the code, the deviation between an area as effectively printed in the picture of module with respect to the area of the module in the ideal image may be determined, in particular the deviation between an area size as effectively printed in the picture of module with respect to the area size of the module in the ideal image. As further used herein, the deviation with respect to the area of a particular module may be defined as the difference between an ideal area of the particular module in the ideal image as generated according to the set of rules from an actual area of the module at the same place in the printed version of the code as printed in the picture of module by the employed printing device. For this purpose, during sub-step iii) the deviation of the at least one module with respect to its theoretical place may be analyzed, in particular, by taking into account that, from the ideal image, an ideal grid may be created which determines a boundary of the modules. As further used herein, the ideal grid may be defined as a set of successive straight lines, wherein the straight lines may be successively arranged in a parallel manner at regular distances. Whereas in a one-dimensional Cartesian coordination system one such set is sufficient to define the ideal grid, in a two-dimensional Cartesian coordination system two such sets are required. However, in a non-Cartesian coordination system, an adapted definition with respect to the respective orientation and the regular distance of the lines may be more suitable. Whereas in the ideal image, all modules perfectly fit inside the ideal grid, in the picture of the printed version of the code, some modules may be slightly shifted with respect to the real grid. Hereby, the area of the at least one module inside its corresponding place within the real grid may, for example, be determined by a known method such as integrating the area, such as by computing a percentage of the area which is effectively printed.

Further according to sub-step iii1), the deviation of the at least one module with respect to a grade of filling the area of the respective module may be analyzed. This deviation may result from an observation that the original printing device may not completely fill the area of at least one of the modules, in particular of a group of the modules or of all of the modules, during the printing process with a printing color, also denoted as printing ink. Within one aspect, the printing device may successively fill the respective areas of the modules with printing ink in the form of geometrical figures which may not exhibit a rectangular or a square form, such as a circle or an oval, which may, thus, produce small areas without printing ink in the picture of the printed version of the code, particular at the borders of the modules and/or at contact points of adjacent modules. Within a further aspect, the printing device may have at least one clogged nozzle, which may result in a missing line along the printed area within at least one of the modules in the picture of the printed version of the code. Within a further aspect, vibrations may occur during the printing process which may cause a distorted image in at least one affected module in the picture of the printed version of the code with respect to the ideal image, which may result in an amended filling of the area in the affected module. Within a further aspect, parallel lines or rectangles which may be used for defining the modules in the ideal image may be printed in a deviating shape by the printing device, in particular in a sinusoidal shape and/or as trapezoids. Within this regard, parameters suitable for defining the deviating shape may be employed in calculating the numerical value for the individual imperfection profile of the printing device.

According to sub-step iii2), the deviation between the real grid as effectively printed in the picture and the ideal grid in the ideal image may be determined. Whereas the ideal image comprises no deviations, the printing process might induce some irregularities which may result in deviations be observable in the picture of the printed version of the code. As an example, in the two-dimensional Cartesian coordination system, the ideal grid comprises two sets of parallel lines in a regular distance, wherein lines from a different set are arranged in right angles with respect to each other, whereas in the real grid which may be determined by the best fitting set of lines with respect to the boundary lines of each module, each line of the real grid may exhibit a positive or a negative value of an angle with respect to the ideal grid. As an example, a succession of the values of the angles and/or the tilting directions may create a unique representation with respect to the particular printed version of the code, wherein in a two-dimensional code, the values of the angles or the tilting directions, respectively, may be determined separately for both dimensions. As a further example, parallel lines in the ideal grid may be printed in a deviating shape by the printing device, in particular in a sinusoidal shape. As a further example, parallel lines in the ideal grid having a predefined distance with respect to each other, such as an equidistant arrangement, may be printed in a deviating manner, such as in a non-equidistant manner, by employing the printing device. Parameters which may be suitable for describing the deviating shape and/or the non-equidistant arrangement may, thus, be used for calculating the numerical value for the individual imperfection profile of the printing device.

According to sub-step iii3), for at least one module in the picture of the printed version of the code, the deviation between a real center of gravity of the module as effectively printed in the picture with respect to an ideal center of gravity of the module in the ideal image may be determined. The starting point of this method, which is closely related to the method according to sub-step iii1) as described above and/or below, may comprise that each module may only be printed inside its respective boundaries as defined by the ideal grid. Consequently, if an effectively printed module may be crossing a line comprised in the ideal grid, the part of the module which may be located outside its boundaries as defined by the ideal grid may be assumed to belong to a different module. Hereby, the center of gravity of a particular module may be determined by a known method which might be applied to calculate the center of gravity of a geometrical figure. By determining the deviation, for each module, between the real center of gravity of the module as effectively printed in the picture with respect to the ideal center of gravity of the module in the ideal image, a vector may be defined, wherein the resulting set of vectors, for all modules in the picture, may be considered as unique for each printed version of the code.

According to sub-step iii4), a boundary curve as effectively printed in the picture may be determined as the deviation from a straight line in the ideal image. Herein, the deviation may be defined by a geometrical difference by which the boundary curve within the printed version of the code may deviate from an ideal straight line as defined in the code generated by the set of rules. As a particular example, during the printing process, the bottom line of the L-finder pattern in a data matrix code as defined above may not be printed as a straight line but rather as a boundary curve, wherein a combination of the curvature and the highest point of the boundary curve may be considered as unique for each data-matrix.

Further, according to any one of the sub-steps iii1), iii2), or iii4), each bar in the picture of the actually printed version of the linear barcode may exhibit an individual diffuse shape which might reveal a specific blurred boundary curve for each bar. This observation may be employed in the determination of the individual imperfection profile of the printing device, in particular, by recording an optical property, especially, a brightness, a refraction, or a transmission, preferably, along a curve which may, preferably, intersect each bar. Whereas each bar in the ideal image has a perfect linear shape and would, thus, produce a rectangular function in a diagram displaying an intensity of the recorded optical property along the line, each bar in the picture of the actually printed version of the linear barcode can actually comprise an individual shape which may result in an individual signature which may exhibit a deviation from the rectangular function, which might, thus, be employed for determining the individual imperfection profile of the printing device.

According to sub-step iii5), for at least one sub-group of modules in the picture of the printed version of the code, the deviation between the real center of gravity of the sub-group of modules effectively printed in the picture with respect to the ideal center of gravity of the sub-group of the modules in the ideal image may be determined. This method is closely related to the method according to sub-steps iii1) and iii3) as described above and/or below, but, in contrast thereto, may analyze a global deviation related to the at least one sub-group of modules within the picture instead of only local deviations related to at least one module, wherein the at least one sub-group of modules comprises at least two adjacent modules, preferably four or more adjacent modules, located together within a part of the ideal image and the of the picture of printed version of the code.

According to sub-step iii6), for at least one module in the picture of the printed version of the code, the deviation between a contrast in the module with respect to the contrast within a printed area in the picture may be determined. Herein, the contrast of each module may be defined as usual in photography and the printed area may comprise the picture of the printed version of the code or a part thereof.

According to sub-step iii7), for at least one module in the picture of the printed version of the code, a relative position of neighboring raster points of an underlying and/or an overprinted low-density image may be determined. This method may be based on the observation that in a printing process the representation of gradient areas is done by rasterizing. Hereby, an area usually appears darker the more raster elements it comprises. On the other hand, an area an underlying and/or an overprinted low-density image with a low color saturation, such as a light grey with a saturation of approx. 1%, comprises only single raster points. In this example, the printing device provides a pattern of raster points, wherein the position of the raster points with respect to the ideal grid in the ideal image may be applied for authentication purposes.

Irrespective of the fact, which of the sub-steps iii1) to iii7) may actually be selected for identifying at least one deviation in the picture with respect to the ideal image, according to the present invention, the individual imperfection profile of the original printing device is finally calculated as a numerical value. In particular contrast to known methods as, for example, disclosed in WO 2013/130946 A1, the deriving of the numerical value of the imperfection profile, neither requires classifying nor ranking the imperfections as recorded in the picture of the printed version of the code. Rather, identifying the deviations in the picture with respect to the ideal image, from which the numerical value which describes the individual imperfection profile of the original printing device may be calculated, may, preferably, be performed without any prior analysis of the mentioned features. Although this kind of procedure may result in a slightly higher data volume as required for storing larger numerical values as the individual imperfection profiles, which might, however, not be relevant in an era of huge and cheap data storage devices. To the contrary, this kind of procedure may, particularly allow achieving a higher processing performance, which can be a quite important feature for being able to accomplish a handling of an increasing flow of goods world-wide. As further used herein, the "processing performance" may express a number of operations which might be performed within a predefined time interval, such as one or more millions of operations within one or more seconds.

As a result of the steps i) to iii), the at least one barcode content of the suspect item as well as the at least one individual imperfection profile of the original item have been determined. The result will, during the following step iv) be employed for storing the individual imperfection profile onto the original item and/or in a database.

According to step iv), the individual imperfection profile of the original item is stored by printing the individual imperfection profile onto the item and/or by generating a database record for the item, wherein the database record comprises at least the barcode content and the individual imperfection profile of the original item. Hereby, printing the individual imperfection profile onto the item may be performed by the original printing device and/or any other printing device which may be adapted for this purpose. In addition, or alternatively, a database record is generated for each original item, wherein each database record comprises at least the database content and the individual imperfection profile of the respective original item, wherein the database content is derived from the barcode content of the original item and the individual imperfection profile is, further, derived from the original item in a unique fashion. Both ways of performance may allow referring later to the individual imperfection profile of the original item, either by reading the individual imperfection profile as printed on the original item and/or by selecting a database record, during step d) of the method for determining the authentication status of the suspect item as will be described later. For further details concerning the database record, reference may be made to the disclosure of the method for determining the authentication status of the suspect item, as disclosed below.

With regard to generating the at least one database record, various known technologies may be employed. Consequently, the respective data might be stored in a fashion as derived or may undergo, prior to storing, one or more further procedures, such as a compression. As disclosed, for example, in WO 2013/130946 A1, the calculated numerical value may, thus, be compressed by using an autocorrelation of the related data prior to assigning it as the imperfection profile. However, within this regard it may, rather, be advantageous to avoid any such procedure which may be time-consuming since it may considerably reduce the processing performance as defined above when applying the method according to the present invention. Therefore, in a preferred embodiment, a procedure which may comprise this advantage may be employed, such as an element generator. As used herein, the "element generator" may comprise a method and/or a device which may be adapted to generate a library of elements, such as a collection of deviations, according to a predefined set of rules. Further, by comparing the respective elements within the library, it may be advantageous to select one or more elements thereof, preferably only a single element for further use. Within this regard, it may, further, be advantageous, not to store the numerical values as comprised within the selected element itself but rather a reference to the selected element. In addition, more than one binary result may be condensed into one or more bytes, preferably, without further compression, in particular due to, as mentioned above, an easy availability of huge and cheap data storage devices.

In a preferred embodiment, the database record as generated during step iv) may be transmitted to the database via one or more channels selected from: a wireless data transmission, a wire bound data transmission, a transmission via a computer network. Hereby, the exact details and manners of the transmission are of little relevance as long as the generated database record is inserted into the database for further reference during step d) of the method for determining the authentication status of the suspect item.

In a particularly preferred embodiment, the method for proving the authentication of the original item may be part of one or more of a production process for producing the item, a process for producing an article accompanying the item, or a packaging process for packaging the item. This kind of performance particularly may ensure that the data which may be later required for a determination of the authentication status of the suspect item may be recorded within the database with little or no time delay, preferably directly within the production or the packaging line. Such an approach may particularly be useful for decreasing the hazard of counterfeit items whose authentication may be proved later by applying the respective method as presented here.

In a further aspect of the present disclosure, a method for determining an authentication status of a suspect item is disclosed. As further used herein, the "authentication status" of a suspect item provides a value which defines whether the suspect item can be considered as the original item to be authenticated, or not, i.e. a counterfeit item. As further used herein, the item may be considered as the original item as long as the item itself or a part thereof or a code, as will be defined further below, assigned to the item or a part thereof may comprise no replica. Consequently, the method for determining the authentication status may, within a first respect, comprise a method for determining a verification of a suspect item or, within a second respect, comprise a method for determining a falsification of a suspect item, depending on the purpose and/or circumstances under which the method may be performed. In other words, the present method may be performed in a case in which it is desired to confirm the authenticity of the suspect item. On the other hand, the present method may also be applied in a case in which the authenticity of the suspect item may be discarded for any reason. Furthermore, the method may also be used under circumstances in which it may be desired to find an answer to an open question whether the item under investigation may be the true original item to be verified or whether the suspect item may be a counterfeit item pretending to be the original item. Within this regard, the present method may deliver a Boolean value which may be designated by TRUE or FALSE, by 1 or 0, or by any other designation and which may comprise the authentication status of the suspect item determined by application of the present method. This Boolean value may further be used by the user of the present method for any purpose, e.g. as an entry into a specific database which may comprise such kind of values, for producing an optical signal or an audio signal or a signal of any other kind upon determining the suspect item to be a counterfeit item, or for separating the suspect item which may have been falsified by the method from an inspection line. However, the present method may be applied under various other circumstances and for any other purpose, which may particularly be based upon any specific need of the user.

For further details concerning the item, the code, the set of rules, the modules, and the barcode content reference may be made to the disclosure of the method for proving the authentication of an original item, as disclosed above and/or below.

In one embodiment, the method of the present disclosure comprises the steps a) to d). These steps are preferably performed in the given order, starting with step a). However, the order of the steps may be altered in an arbitrary way, particularly by reversing the order of two consecutive steps. Further, one or more steps may be performed repeatedly, depending or not whether other steps are equally repeated. The method may further comprise one or more additional steps.

According to step a), at least one picture of the printed version of the code as being printed onto the item is recorded. In a most preferred embodiment, the same or a similar optical system which may already be employed in an inspection line for deriving the at least one barcode content of the item being encoded within the plurality of modules may also be used in the method for determining the authentication status of the suspect item. This particular embodiment may, therefore, allow using the same equipment for an additional purpose related to the authenticity of the suspect item, thus, avoiding the necessity of an upgrade of already existing facilities. Within this regard, it has to be taken into account that the optical system may comprise the ability to record at least 5 pictures per minute, preferably at least 400 pictures per minute, more preferably at least 2000 pictures per minute. Such a feature may be of particular relevance for the applicability of the present method within high performance industrial lines.

Within this regard, it is mentioned that the authentication of the code may require a picture of a printed version of the code which may exhibit a reasonable quality and a sufficient resolution. In case of a poor quality and/or a low resolution of the picture of a printed version of the code, the present authentication method may provide distorted results, such that a copy of the code may be mistaken for a genuine code one or vice-versa. Such a feature may be particularly applicable to the data matrix barcode. Therefore, it may be useful to ensure, before performing any further processing of a given picture of a printed version of the code, that the picture may comprise a reasonable quality and resolution. Besides this general requirement, the method according to the present disclosure does not depend on the resolution of the picture of a printed version of the code. In further contrast to the method as for example disclosed in WO 2013/130946 A1, the numerical value for the imperfection profile does not depend on the resolution of the picture, particularly not in a case in which a first picture of the printed version of the code as printed onto the original item is recorded with a different resolution than a second picture as recorded later from the same printed version of the same code on the same item which may, later, be considered as a suspect item. In order to further support this feature, only such irregularities in the picture may be taken into account for deriving the imperfection profile which may not provide any problems with the above-mentioned comparatively low resolution, such as about 5 pixels per module and per dimension.

In the field of image processing various methods exist which may be applied to determine the quality of a given optical image, such as a detection of a blur of the image, a detection of sharp edges within the image, a frequency analysis of the image, e.g. by using a wavelet transformation or a Fourier transformation. Surprisingly, it has been found that the existing procedures for image processing may not deliver the required results for pictures of a printed version of the data matrix barcode, since these procedures may generally not be adapted for the characteristics of the data matrix barcode, in particular, not to its binary nature.

In a preferred embodiment, which may be particularly applicable to images taken by a cell phone, the following procedure may, nevertheless, be applied for a quick and efficient analysis of a given picture of a printed version of the data matrix barcode. Within a first sub-step, the picture of the data matrix barcode may be isolated from remaining parts of the picture, particularly by disregarding the remaining parts of the picture. Consequently, any poor quality and/or low resolution which might occur within the remaining parts of the picture may, thus, be excluded from disturbing the further processing of the picture. Thereafter, at least one of the following sub-procedures may be performed with regard to the picture of the printed version of the data matrix barcode:

Verifying a correct exposition of the picture;
Examining a distribution of an illumination over the picture;
Reviewing a contrast of picture;
Disproving an existence of a blur, such as a motion blur and/or a focus blur, within the picture.

Hereby, the exposition, the illumination, and the contrast of the picture may be defined as usually in photography and imaging. The exposition of the picture should preferably be corrected in a manner that the printed version of the data matrix barcode is fully depicted within the picture within a predefined range of tolerable deviations from an ideal image according to the code as defined by the set of rules. Further, the illumination of the picture should preferably be evenly distributed over the area of the picture within a given range of tolerance. Further, the contrast of the picture should exceed a predetermined threshold. In addition, blurring may usually occur due to an aberration caused by recording an image being out of focus. Consequently, any measure adapted for adjusting the focus into the plane of the picture of the printed version of the data matrix barcode might be helpful within this regard.

Herein, a performance of each of these sub-procedures may be particularly adapted for being employed to the analysis of a picture of the printed version of a data matrix barcode in such a manner that it takes into account its binary nature. In case any one of these sub-procedures may not deliver a result being able to prove a reasonable quality and a sufficient resolution of the image of the data matrix barcode within the picture, the given picture may be rejected and a further picture may be recorded by the optical system, in particular by employing the cell phone again. This procedure may be repeated unless a picture of the printed version of the data matrix barcode may be obtained which might exhibit the reasonable quality and the sufficient resolution for the further processing. In addition, the picture may be further modified by any one or more of the sub-steps i1) to i4) as described above for the method for proving the authentication of the original item.

According to step b) of the present method for determining the authentication status of the suspect item, the at least one barcode content is decoded from the picture of the printed version of the code according to the set of rules as defined above. Hereby, the decoding may preferably be performed on the same picture of the printed version as recorded by the optical system and/or from the picture which has been further modified by any one or more of the sub-steps i1) to i4) or any further or subsequent sub-step. As a result of performing step b), the at least one barcode content which is related to the item has been acquired.

According to step c), irregularities in the picture according to step iii) as described above and/or below are analyzed by identifying at least one deviation in the picture with respect to the ideal image and a numerical value which describes an individual imperfection profile of the printing device is calculated. For further details of this step, reference is made to step iii) of the method for proving the authentication of the original item, during which an analysis of the original item is made which may mutatis mutandis be applicable to the analysis of the suspect item as performed according to step c).

As a result of the steps a) to c), the at least one barcode content of the suspect item as well as the at least one individual imperfection profile of the suspect item have been acquired. The result will, during the subsequent step d), be employed to determine on this basis the authentication status of the suspect item. With regard to the individual imperfection profile reference may again be made to the disclosure of the method for proving the authentication of the original item, as disclosed above and/or below.

According to step d), it is checked whether the code on the suspect item has been printed with the original printing device by comparing the individual imperfection profile of the suspect item with the stored individual imperfection profile of the original item. Within this regard, the individual imperfection profile which may have been printed on the original may be recorded, in particular by using the recording device which may be already employed in recording the picture of the printed version of the code according to step a) of the present method.

Alternatively, or in addition, the at least one barcode content of the suspect item is used to select a database record within a database which comprises a number of records in which at least both the database content and an individual imperfection profile of the original item which may preferably comprise a numeric value are stored. In a particularly preferred embodiment, the record of the database may comprise a composite number which at least contains the database content and the individual imperfection profile of the respective original item. Hereby, the at least one barcode content of the item is used to clearly identify the record in the database which is related to the barcode content and, in this manner, to obtain the individual imperfection profile being related to of the suspect item, simultaneously. This way of procedure allows a direct, fast, and reliable selection of the database record related to the suspect item.

Further according to step d), the individual imperfection profile parameter of the suspect item as derived during step c) is compared with the individual imperfection profile of the original item as obtained during step d) within a comparing step. Hereby, a comparison of the individual imperfection profile related to the suspect item with the individual imperfection profile related to the original item allows determining the authentication status of the suspect item. As further used herein, the "comparing step" includes comparing the individual imperfection profile of the suspect item with the individual imperfection profile of the original item with regard to their identity but also taking into account any tolerance levels within which the authenticity of the suspect item may be still assumed. Introducing tolerance levels may particularly allow taking into account inevitable adverse effects, such as deterioration, ageing, or wear, of the printed version of the code on the surface of the item.

The present method for determining the authentication status of the suspect item may further comprise a transmission step by which, preferably after one or more of the method steps step a), step b), or step c), data may be transformed to a data processing unit via a computer network in such a manner that the further steps after the transmission may be performed by the data processing unit, wherein the authentication status of the suspect item may be returned by the data processing unit. This transmitting step may particularly be performed by at least one control unit which may be adapted to perform or to have performed at least method step a) as well the data transmission. The control unit may comprise a computer or a micro-computer, wherein the micro-computer may be part of the optical system, of a system which may control the optical system, or of a system which may be in connection with the optical system. Which kinds of data are transmitted by the control unit to the data processing unit may particularly depend at which stage during the performance of the present method the actual data transmission takes place. As an example, after step a) the at least one picture of the printed version of the code as recorded by the optical system may be transferred to the data processing unit on which the further steps b) to d) may be performed until the authentication status of the suspect item may be determined and returned to the at least one control unit. As a further example, the at least one picture taken from the printed version of the code may first be modified according to step a) and the at least one barcode content of the item may also be derived from the picture according to the set of rules according to step b) before the modified picture together with the at least one barcode content may be transmitted by the at least one control unit to the data processing unit for performing the further steps c) and d) until the authentication status of the item may be determined and returned to the at least one control unit. As a further example, the steps a) to c) may be performed locally until the control unit may transmit the at least one barcode content together with the individual imperfection profile determined for the suspect item to the data processing unit where only the remaining step d) may be performed until the authentication status of the suspect item may be determined and returned to the at least one control unit. In this particular embodiment it might be advantageous that the database may be one or more of comprised within the processing unit or operationally connected to the data processing unit.

In a further aspect of the present disclosure, a proving apparatus for proving an authentication of an original item is disclosed. Within this regard, a code is assigned to the item according to a set of rules, wherein the code comprises a plurality of modules arranged in an ideal image, wherein at least one barcode content of the item is encoded within the plurality of modules, wherein at least one printed version of the code is printed onto the item with a printing device. The proving apparatus comprises at least the parts I) to IV), which may be arranged in any suitable order. Further, additional parts may be comprised in the proving apparatus which are not mentioned in the following. The parts may be part of one combined apparatus or centralized unit or may be combined in different apparatuses or de-centralized units, wherein the apparatuses are adapted to interact in any suitable fashion, such as by wire-bound communication and/or wireless communication.

Herein, Part I) of the proving apparatus comprises a recording device configured for recording at least one picture of the printed version of the code printed onto the item, whereas part II) comprises a decoding device configured for decoding the barcode content from the picture. Part III) comprises an analysis device configured for analyzing irregularities in the picture by identifying at least one deviation in the picture with respect to the ideal image and for calculating a numerical value which describes an individual imperfection profile of the printing device. Part IV) of the proving apparatus comprises a storing device for storing the individual imperfection profile, wherein the storing device comprises the same or a further printing device configured for printing the individual imperfection profile onto the item and/or a generating device configured for generating a database record for the item. Hereby, each database record comprises at least the barcode content and the individual imperfection profile of the respective original item. For further details concerning the various parts of the proving apparatus, reference may be made to the disclosure elsewhere in this document. In a particularly preferred embodiment, the proving apparatus is configured to perform the method for proving the authentication of the original item as described above and/or below.

In a preferred embodiment, the proving apparatus may be part of one or more devices which are selected from: a production apparatus for producing the item, an apparatus for producing an article which accompanies the item, or a packaging apparatus for packaging the item. This kind of embodiment may be particularly useful for strictly combining the production and/or the packaging of the item with the apparatus which generates the database record being related to the item. This arrangement may particularly allow ensuring that the individual imperfection profile as stored on the item and/or in the database record may actually be related to the item to which it may allegedly belong. Such a strong physical relationship of the mentioned devices may be particularly intended to reduce the counterfeit hazard with relation to items of some value.

In a further aspect of the present disclosure, an authentication apparatus for determining the authentication status of the suspect item is disclosed. Within this regard, a code is assigned to the item according to a set of rules, wherein the code comprises a plurality of modules arranged in an ideal image, wherein at least one barcode content of the item is encoded within the plurality of modules, wherein at least one printed version of the code is printed onto the item with a printing device. According to the present invention, the authentication apparatus at least comprises parts A) to D), which may be assembled in any suitable fashion. Further, additional parts may be comprised within the authentication apparatus which are not mentioned in the following. The parts may be part of one combined apparatus or centralized unit or may be combined in different apparatuses or de-centralized units, wherein the apparatuses are adapted to interact in any suitable fashion, such as by wire-bound communication and/or wireless communication.

Part A) of the authentication apparatus comprises a recording device configured for recording at least one picture of the printed version of the code printed onto the item, whereas part B) comprises a decoding device configured for decoding the barcode content from the picture. Part C) comprises an analysis device configured for analyzing irregularities in the picture by identifying at least one deviation in the picture with respect to the ideal image and for calculating a numerical value which described an individual imperfection profile of the printing device. Part D) comprises a comparing device configured for comparing the individual imperfection profile of the suspect item with the individual imperfection profile of the original item, by which comparison the authentication status of the suspect item is determined. For further details of the authentication apparatus reference may be made to the disclosure of the proving apparatus, as disclosed elsewhere in this document. In a particularly preferred embodiment, the authentication apparatus may be configured to perform the method for determining the authentication status of the suspect item as described above and/or below.

In a particularly preferred embodiment, the authentication apparatus may be further adapted to control the transmission of data to a data processing unit. Within this regard, the transmission of the data may be performed via one or more transmission means selected from a wireless data transmission, a wire bound data transmission, and/or a transmission via a computer network. Further details concerning the data transmission, the data and the data processing unit may be found elsewhere in this description.

In a further aspect of the present disclosure, a use of the authentication apparatus is disclosed. Within this respect, the authentication apparatus may preferentially be used for an authentication of suspect items which carry a code, wherein the item is at least one item or comprises at least one item selected from the group consisting of:

a physical object where the code is printed on the surface of the object;
an accompanying article, such as a label, or a document;
a primary packaging, such as a bottle, a syringe, a vial, an ampoule, a carpule, a blister;
a secondary packing, such as a folding box, a plurality of folding boxes wrapped with plastic foil, called a bundle, a hangtag, a cardboard box, a shipping carton, a container.

For further details regarding the item, reference may be made to the disclosure of the item, as disclosed above and/or below.

The disclosure further describes and proposes a computer program, including computer executable instructions for performing both the method for proving the authentication of the original item and the hereto related method for determining the authentication status of the suspect item, when the program is executed on a computer or a computer network. Preferentially, the computer program may be stored on a computer readable data carrier. Within this regard, the disclosure further describes a data carrier having a data structure stored thereon, which, after loading into a computer or a computer network, is capable of executing any or all methods as disclosed herein. As further used herein, a computer may comprise any device which may be capable of storing data and/or performing calculating steps and/or instructing steps. By way of example, this definition may not only include work stations and notebooks but also application-specified integrated circuits (ASICs) and field-programmable gate arrays (FPGAs).

Preferably, referring to the computer-implemented aspects of the present disclosure, one or more of the method steps or even all of the method steps of any or all methods disclosed herein may be performed by using a computer or a computer network. Thus, generally, any of the method steps including provision and/or manipulation of data may be performed by using a computer or a computer network. Generally, these method steps may include any of the method steps.

The disclosure further describes and proposes a computer program including computer-executable instructions for performing any or all methods according to the present invention in one or more of the embodiments enclosed herein when the program is executed on a computer or computer network. Preferentially, the computer program may be stored on a computer-readable data carrier. Thus, preferably, one, more than one or even all of method steps as indicated above may be performed by using a computer or a computer network, preferably by using a computer program.

The disclosure further describes and proposes a computer program product having program code means, in order to perform any or all methods according to the present invention in one or more of the embodiments enclosed herein when the program is executed on a computer or computer network. Preferentially, the program code means may be stored on a computer-readable data carrier.

Further, the disclosure describes and proposes a data carrier having a data structure stored thereon, which, after loading into a computer or computer network, such as into a working memory or main memory of the computer or computer network, may execute any or all methods according to one or more of the embodiments disclosed herein.

The disclosure further describes and proposes a computer program product with program code means stored on a machine-readable carrier, in order to perform any or all methods according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Preferentially, the computer program product may be distributed over a data network.

Finally, the disclosure describes and proposes a modulated data signal which contains instructions readable by a computer system or computer network, for performing any or all methods according to one or more of the embodiments disclosed herein.

Preferably, referring to the computer-implemented aspects of the disclosure, one or more of the method steps or even all of the method steps of any or all methods according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

The methods and devices according to the present disclosure are considerably distinguished from known methods and devices according to the state of the art and, thus, provide a number of advantages with regard to the state of the art.

Within a first point of view, the present method and apparatus for determining the authentication status of a suspect item may readily be employed within new or existing industrial facilities comprising optical systems. As an example, in the pharmaceutical industry, but not limited hereto, the barcodes may be printed onto the items for serializing single products. For a purpose of verifying the readability of the barcodes printed on items, optical systems configured for decoding the barcodes may be used. In order to ensure a high quality of the barcodes, various standards may be available. Since these standards, as mentioned, may be generally focused on the readability of the barcodes, they may rely on examining symmetry and/or contrast ratio of the barcode by determining mean values of such kinds of parameters. Consequently, for this task it may be generally sufficient to employ optical systems which require a comparatively low resolution of approx. 5 pixels per module. However, these kinds of optical systems currently used for ensuring barcode quality, are not able to be employed in any authentication method according to the state of the art.

On the other hand, the readability of barcodes is generally not impaired by errors occurring within a module. Currently, appropriate algorithms are used in order to provide the quality of barcodes printed on items or to ensure their readability despite such errors, see e.g. WO 01/53101 A1. In contrast to the state of the art, the present methods rather concentrate on irregularities which usually occur randomly in the picture of the printed version of the code, a feature which particularly qualifies them to be suitable for such a purpose. According to the present invention, these kinds of irregularities may, therefore, be used, alternatively and/or in addition to their known use, for proving and/or determining the authentication of a code being related to an item. Consequently, analyzing procedures which may be employed within the present method may, thus, generally not be the same as procedures used for other purposes.

In contrast to the state of the art, embodiments of the methods disclosed herein for determining the authentication status of a suspect item may be employed within industrial facilities for a fast and still reliable authenticating of a plurality of items. Moreover, embodiments of the present disclosure may allow making use of existing recording devices which may be already adapted for recording print images with speeds and typically low resolutions, such as approx. 5 pixels per module, as generally employed within industrial facilities. These properties may constitute a particularly attractive feature since less effort and fewer adaptions to known systems and procedures may facilitate an implementation of the present disclosure. Moreover, since such facilities may be designed to record up to 2,000 or more pictures per minute, embodiments of the methods disclosed herein may be performed at a speed much faster than any other known authentication method.

A further advantage may be found in the observation that the barcode content being already decoded within the barcode may, after decoding preferably within the same picture as, nevertheless, required for the authentication procedure, be used for a fast and purposeful identification of the suspect item through a database record further comprising data which are related to the authentication of the item. In addition, this advantage particularly may reduce the requirements for a discriminability of authentication data and, at the same time, may decrease the possibility of a false-positive or a false-negative identification.

Summarizing the findings of the present disclosure, the following embodiments are preferred:

Embodiment 1

A method for proving an authentication of an original item, wherein a code is assigned to the item according to a set of rules, wherein the code comprises a plurality of modules arranged in an ideal image, wherein at least one barcode content of the item is encoded within the plurality of modules, wherein at least one printed version of the code is printed onto the item with an original printing device, the method comprising the following steps:
   i) Recording at least one picture of the printed version of the code printed onto the item;
   ii) Decoding the barcode content from the picture;
   iii) Analyzing irregularities in the picture by identifying at least one deviation in the picture with respect to the ideal image and calculating a numerical value describing an individual imperfection profile of the original printing device, wherein the calculating of the numerical value of the individual imperfection profile depends on at least one unique feature inherently related to the original printing device, wherein the at least one unique feature is selected from at least one of a printing technology and a setting of the printing device;
   iv) Storing the individual imperfection profile by printing the individual imperfection profile onto the item and/or by generating a database record for the item, wherein the database record comprises at least the barcode content and the individual imperfection profile.

Embodiment 2

A method for proving an authentication of an original item, wherein a code is assigned to the item according to a set of rules, wherein the code comprises a plurality of modules arranged in an ideal image, wherein at least one barcode content of the item is encoded within the plurality of modules, wherein at least one printed version of the code is printed onto the item with an original printing device, the method comprising the following steps:
   i) Recording at least one picture of the printed version of the code printed onto the item;
   ii) Decoding the barcode content from the picture;
   iii) Analyzing irregularities in the picture by identifying at least one deviation in the picture with respect to the ideal image and calculating a numerical value describing an individual imperfection profile of the original printing device;
   iv) Storing the individual imperfection profile by printing the individual imperfection profile onto the item and/or by generating a database record for the item, wherein the database record comprises at least the barcode content and the individual imperfection profile.

Embodiment 3

The method according to the preceding embodiment, wherein step iii) comprises at least one of the following sub-steps:
   iii1) Determining, for at least one module, the deviation between an area size effectively printed in the picture of module with respect to the area size of the module in the ideal image;
   iii2) Determining the deviation between a real grid effectively printed in the picture and the ideal grid in the ideal image;
   iii3) Determining, for at least one module, the deviation between a real center of gravity of the module effectively printed in the picture with respect to the ideal center of gravity of the module in the ideal image;
   iii4) Determining a curvature of a boundary line effectively printed in the picture as the deviation from a straight line in the ideal image;
   iii5) Determining, for at least one sub-group of modules, the deviation between the real center of gravity of the sub-group of modules effectively printed in the picture with respect to the ideal center of gravity of the sub-group of the modules in the ideal image;
   iii6) Determining, for at least one module, the deviation between a contrast in the module with respect to the contrast within a printed area in the picture;
   iii7) Determining for at least one module, a relative position of neighboring raster points of an underlying and/or overprinted low-density image.

Embodiment 4

The method according to the preceding embodiment, wherein a number of the sub-steps iii1) to iii7) are selected for calculating the numerical value of the individual imperfection profile depending on at least one of a printing technology and a setting of the printing device.

Embodiment 5

The method according to any one of the preceding embodiments, wherein step i) comprises at least one of the following sub-steps:
i1) Locating the picture of the printed version of the code;
i2) Rearranging a spatial orientation of the picture;
i3) Cutting or cropping the picture at least at one side and/or at one edge;
i4) Transforming the picture into a binary format.

Embodiment 6

The method according to any one of the preceding embodiments, wherein step i) comprises at least one of the following sub-procedures which are applied to the picture of the printed version of the code:
Isolating an image of the barcode from any other parts of the picture;
Verifying a correct exposition of the picture;
Examining a distribution of an illumination over the picture;
Reviewing a contrast of picture;
Disproving an existence of a blur, such as a motion blur and/or a focus blur, within the picture.

Embodiment 7

The method according to any one of the preceding embodiments, wherein the database record is transmitted to the database via one or more of: a wireless data transmission, a wire-bound data transmission, a transmission via a computer network.

Embodiment 8

The method according to any one of the preceding embodiments, wherein the method is part of one or more of a production process for producing the item, a process for producing an article accompanying the item, or a packaging process for packaging the item.

Embodiment 9

A method for determining an authentication status of a suspect item, wherein a code is assigned to the item according to a set of rules, wherein the code comprises a plurality of modules arranged in an ideal image, wherein at least one barcode content of the item is encoded within the plurality of modules, wherein at least one printed version of the code is printed onto the item with a printing device, the method comprising the steps of:
a) Recording at least one picture of the printed version of the code printed onto the item;
b) Decoding the barcode content from the picture;
c) Analyzing irregularities in the picture according to step iii) of any one of the preceding embodiments by identifying at least one deviation in the picture with respect to the ideal image and calculating a numerical value describing an individual imperfection profile of the printing device, wherein the calculating of the numerical value of the individual imperfection profile depends on at least one unique feature inherently related to the printing device, wherein the at least one unique feature is selected from at least one of a printing technology and a setting of the printing device;
d) Checking whether the code on the suspect item has been printed with the original printing device by comparing the individual imperfection profile of the suspect item with the stored individual imperfection profile of the original item, by which comparison the authentication status of the suspect item is determined.

Embodiment 10

A method for determining an authentication status of a suspect item, wherein a code is assigned to the item according to a set of rules, wherein the code comprises a plurality of modules arranged in an ideal image, wherein at least one barcode content of the item is encoded within the plurality of modules, wherein at least one printed version of the code is printed onto the item with a printing device, the method comprising the steps of:
a) Recording at least one picture of the printed version of the code printed onto the item;
b) Decoding the barcode content from the picture;
c) Analyzing irregularities in the picture according to step iii) of any one of the preceding embodiments by identifying at least one deviation in the picture with respect to the ideal image and calculating a numerical value describing an individual imperfection profile of the printing device;
d) Checking whether the code on the suspect item has been printed with the original printing device by comparing the individual imperfection profile of the suspect item with the stored individual imperfection profile of the original item, by which comparison the authentication status of the suspect item is determined.

Embodiment 11

The method according to any one of the two preceding embodiments, wherein a transmission of data to a data processing unit is performed via a computer network, wherein the further steps after the transmission are performed by the data processing unit, wherein the authentication status of the suspect item is returned by the data processing unit, wherein the data are preferably transmitted by at least one control unit, the control unit being adapted to perform or to having performed at least method step a), wherein the data transmission preferably takes place after one or more of the method steps step a), step b), or step c).

Embodiment 12

The method according to any one of the three preceding embodiments, wherein a transmission of data to a data processing unit is performed via a computer network, wherein the further steps after the transmission are performed by the data processing unit, wherein the authentication status of the suspect item is returned by the data processing unit.

Embodiment 13

The method according to the preceding embodiment, wherein the data are transmitted by at least one control unit, the control unit being adapted to perform or to having performed at least method step a).

Embodiment 14

The method according to any one of the two preceding embodiments, wherein the data transmission takes place after one or more of the method steps step a), step b), or step c).

Embodiment 15

The method according to any one of the three preceding embodiments, wherein the individual imperfection profile of the original item is stored in a database, wherein the database is one or more of comprised within the data processing unit or operationally connected to the data processing unit.

Embodiment 16

The method according to the preceding embodiment, wherein the record of the database comprises a composite number containing at least the database content and the individual imperfection profile of the original item.

Embodiment 17

The method according to any one of the preceding embodiments, wherein the item is selected from the group consisting of: a physical object; an accompanying article, such as a label, or a document; a primary packaging, such as a bottle, a syringe, a vial, an ampoule, a carpule, or a blister; and a secondary packing, such as a folding box, a hangtag, a cardboard box, a shipping carton, or a container.

Embodiment 18

The method according to any one of the preceding embodiments, wherein the set of rules allows generating a two-dimensional barcode and/or a one-dimensional barcode and/or a dot code, wherein the set of rules is preferably retrieved from a standard specification defining the code.

Embodiment 19

The method according to any one of the preceding embodiments, wherein the set of rules are retrieved from a standard specification defining the code.

Embodiment 20

The method according to the preceding embodiment, wherein the standard specification may preferentially be selected from the group consisting of:
- a data matrix barcode, as defined according to ISO/IEC 16022;
- a QR barcode, as defined according to ISO/IEC 18004; and/or
- a linear barcode 128, as defined according to ISO/IEC 15417.

Embodiment 21

The method according to any one of the preceding embodiments, wherein the plurality of modules comprises at least 30 modules, more preferably at least 100 modules, most preferably at least 200 modules.

Embodiment 22

A proving apparatus for proving an authentication of an original item, wherein a code is assigned to the item according to a set of rules, wherein the code comprises a plurality of modules arranged in an ideal image, wherein at least one barcode content of the item is encoded within the plurality of modules, wherein at least one printed version of the code is printed onto the item with a printing device, the assigning apparatus comprising:

I.) A recording device configured for recording at least one picture of the printed version of the code printed onto the item;

II.) A decoding device configured for decoding the barcode content from the picture;

III.) An analysis device configured for analyzing irregularities in the picture by identifying at least one deviation in the picture with respect to the ideal image and for calculating a numerical value describing an individual imperfection profile of the printing device, wherein the calculating of the numerical value of the individual imperfection profile depends on at least one unique feature inherently related to the printing device, wherein the at least one unique feature is selected from at least one of a printing technology and a setting of the printing device;

IV.) A storing device for storing the individual imperfection profile, wherein the storing device comprises the same or a further printing device configured for printing the individual imperfection profile onto the item and/or a generating device configured for generating a database record for the item, wherein the database record comprises at least the barcode content and the individual imperfection profile.

Embodiment 23

A proving apparatus for proving an authentication of an original item, wherein a code is assigned to the item according to a set of rules, wherein the code comprises a plurality of modules arranged in an ideal image, wherein at least one barcode content of the item is encoded within the plurality of modules, wherein at least one printed version of the code is printed onto the item with a printing device, the assigning apparatus comprising:

I.) A recording device configured for recording at least one picture of the printed version of the code printed onto the item;

II.) A decoding device configured for decoding the barcode content from the picture;

III.) An analysis device configured for analyzing irregularities in the picture by identifying at least one deviation in the picture with respect to the ideal image and for calculating a numerical value describing an individual imperfection profile of the printing device;

IV.) A storing device for storing the individual imperfection profile, wherein the storing device comprises the same or a further printing device configured for printing the individual imperfection profile onto the item and/or a generating device configured for generating a database record for the item, wherein the database record comprises at least the barcode content and the individual imperfection profile.

Embodiment 24

The proving apparatus according to any one of the two preceding embodiments, wherein the proving apparatus is part of one or more of: a production apparatus for producing the item, an apparatus for producing an article accompanying the item, or a packaging apparatus for packaging the item.

Embodiment 25

An authentication apparatus for determining an authentication status of a suspect item, wherein a code is assigned to the item according to a set of rules, wherein the code comprises a plurality of modules arranged in an ideal image, wherein at least one barcode content of the item is encoded within the plurality of modules, wherein at least one printed version of the code is printed onto the item with a printing device, the authentication apparatus comprising:
- A) A recording device configured according to the three preceding embodiments;
- B) A decoding device configured according to the three preceding embodiments;
- C) An analysis device configured according to the three preceding embodiments;
- D) A comparing device configured for comparing the individual imperfection profile of the suspect item with the individual imperfection profile of the original item, by which comparison the authentication status of the suspect item is determined.

Embodiment 26

The authentication apparatus according to the preceding embodiment, wherein the authentication apparatus is configured to perform the method for determining an authentication status according to any one of the preceding embodiments referring to a method for determining an authentication status.

Embodiment 27

The authentication apparatus according to any of the two preceding embodiments, wherein the recording device comprises an optical system, wherein the optical system comprises at least one element which is selected from the group consisting of: a flatbed scanner, a camera, a barcode hand-scanning device, a laptop webcam, a cell phone, a smartphone, a tablet computer.

Embodiment 28

The authentication apparatus according to the preceding embodiment, wherein the optical system is configured for recording at least 5 pictures per minute, preferably at least 400 pictures per minute, more preferably at least 2,000 pictures per minute.

Embodiment 29

The authentication apparatus according to any one of the two preceding embodiments, wherein the plurality of modules comprises at least 30 modules, more preferably at least 100 modules, most preferably at least 200 modules.

Embodiment 30

The authentication apparatus according to any one of the three preceding embodiments, wherein the optical system comprises a resolution of 20 pixels per module per dimension or less, such as 3 to 15 pixels per module per dimension, preferably 4 to 10 pixels per module per dimension, most preferably 5 pixels per module per dimension.

Embodiment 31

The authentication apparatus according to any one of the preceding embodiments referring to an authentication apparatus, wherein the authentication apparatus is adapted to control a transmission of data to a data processing unit, wherein the transmission of the data is performed via one or more of: a wireless data transmission, a wire-bound data transmission, a transmission via a computer network.

Embodiment 32

A use of the authentication apparatus according to any one of the preceding embodiments referring to authentication apparatus for determining an authentication status of a suspect item comprising a printed version of a code, wherein the item is selected from a group consisting of: a physical object; an accompanying article, such as a label, or a document; a primary packaging, such as a bottle, a syringe, a vial, an ampoule, a carpule, or a blister; and a secondary packing, such as a folding box, a hangtag, a cardboard box, a shipping carton, or a container.

Embodiment 33

A computer program including computer-executable instructions for performing the methods according to any one of the preceding method embodiments, when the program is executed on a computer or computer network.

Embodiment 34

A data carrier having a data structure stored thereon, which, after loading into a computer or computer network, is capable of executing the methods according to any one of the preceding method embodiments.

Embodiment 35

A computer or computer network comprising at least one processor, wherein the processor is adapted to perform the method according to one of the embodiments described in this disclosure.

Embodiment 36

A computer loadable data structure that is adapted to perform the method according to one of the embodiments described in this disclosure while the data structure is being executed on a computer,

Embodiment 37

A computer program, wherein the computer program is adapted to perform the method according to one of the embodiments described in this disclosure while the program is being executed on a computer,

Embodiment 38

A computer program comprising program means for performing the method according to one of the embodiments described in this disclosure while the computer program is being executed on a computer or on a computer network, Embodiment 39

A computer program comprising program means according to the preceding embodiment, wherein the program means are stored on a storage medium readable to a computer, Embodiment 40

A storage medium, wherein a data structure is stored on the storage medium and wherein the data structure is adapted to perform the method according to one of the embodiments described in this disclosure after having been loaded into a main and/or working storage of a computer or of a computer network, and Embodiment 41

A computer program product having program code means, wherein the program code means can be stored or are stored on a storage medium, for performing the method according to one of the embodiments described in this disclosure, if the program code means are executed on a computer or on a computer network.

Further optional features and embodiments will be disclosed in more detail in the subsequent description. The disclosed optional features may be realized in an isolated fashion as well as in any arbitrary feasible combination, as the skilled person will realize. The scope of the invention is not restricted by the preferred embodiments

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein:

FIGS. 4A and 4B schematically show a data matrix barcode with a grid being aligned to the modules in the effectively printed picture of the data matrix barcode (FIG. 4A) and a comparison of the lines in the real grid in the effectively printed picture with the lines in the ideal grid of the ideal image (FIG. 4B);

FIGS. 5A and 5B schematically present the ideal centers of gravity of the modules in the ideal image (FIG. 5A) and the real centers of gravity of the modules in the effectively printed picture of the data matrix barcode (FIG. 5B);

FIGS. 10A and 10B schematically depict an ideal image of a data matrix barcode (FIG. 10A) and a picture of an actually printed version of the data matrix barcode (FIG. 10B), wherein the effectively printed area of the modules deviates from the area of the modules in the ideal image due to printing ink missing between adjacent modules;

FIGS. 15A, 15B and 15C schematically show an overview of three different preferred embodiments for the performing the method for determining the authentication status of a suspect item (FIGS. 15A to 15C);

FIG. 17 shows a schematically overview over a preferred embodiment of a proving apparatus for proving an authentication of an original item.

Figure 1:
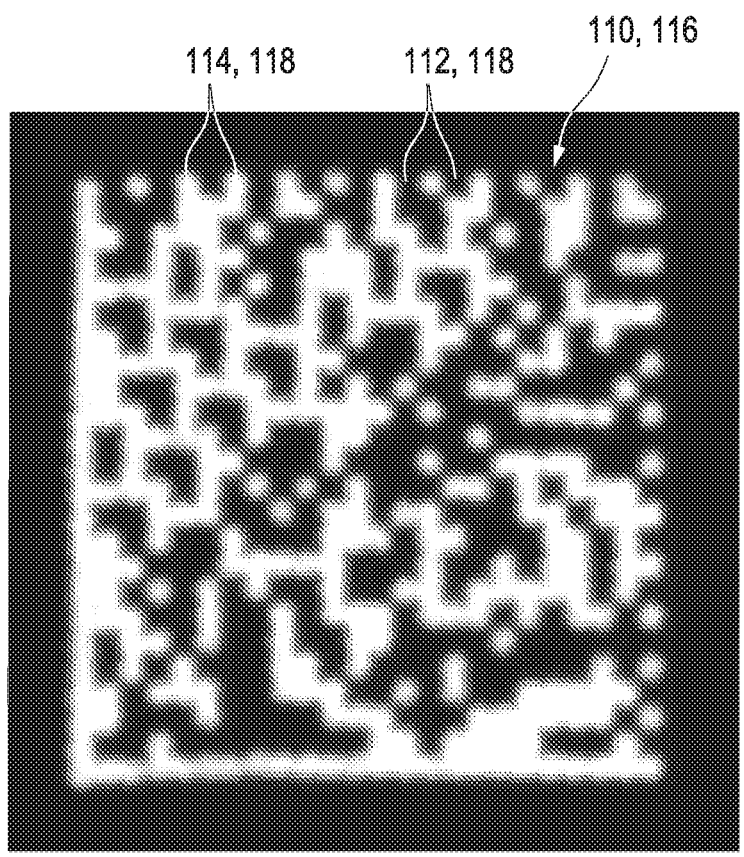
FIG. 1 shows a typical example of a picture of a printed version of a two dimensional data matrix barcode.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

Figure 9:
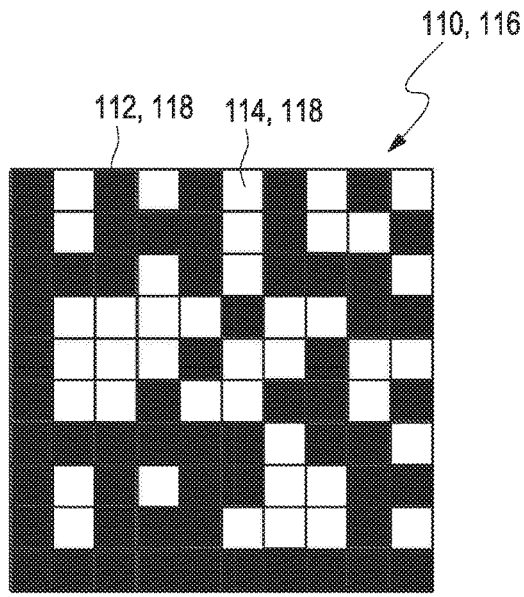
FIGS. 9A, 9B and 9C schematically show an ideal image of a data matrix barcode (FIG. 9A), a picture of an actually printed version of the data matrix barcode with irregularities which comprise a deviation with respect to a contrast in the module (FIG. 9B), and a comparison between an ideal image of a linear barcode and an actually printed version of the linear barcode with irregularities with respect to the contrast (FIG. 9C)
Figure 9:
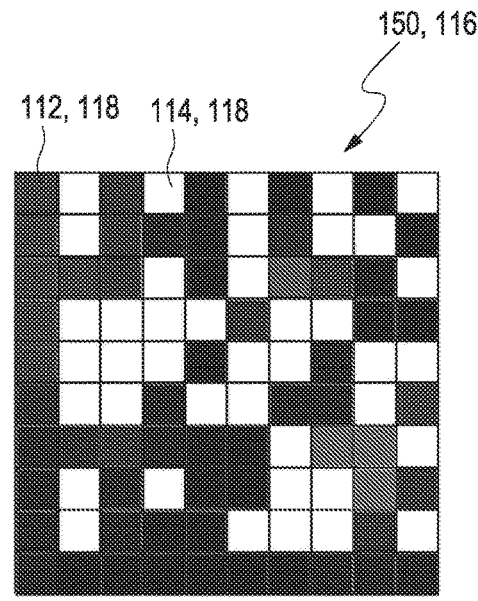
Figure 9:
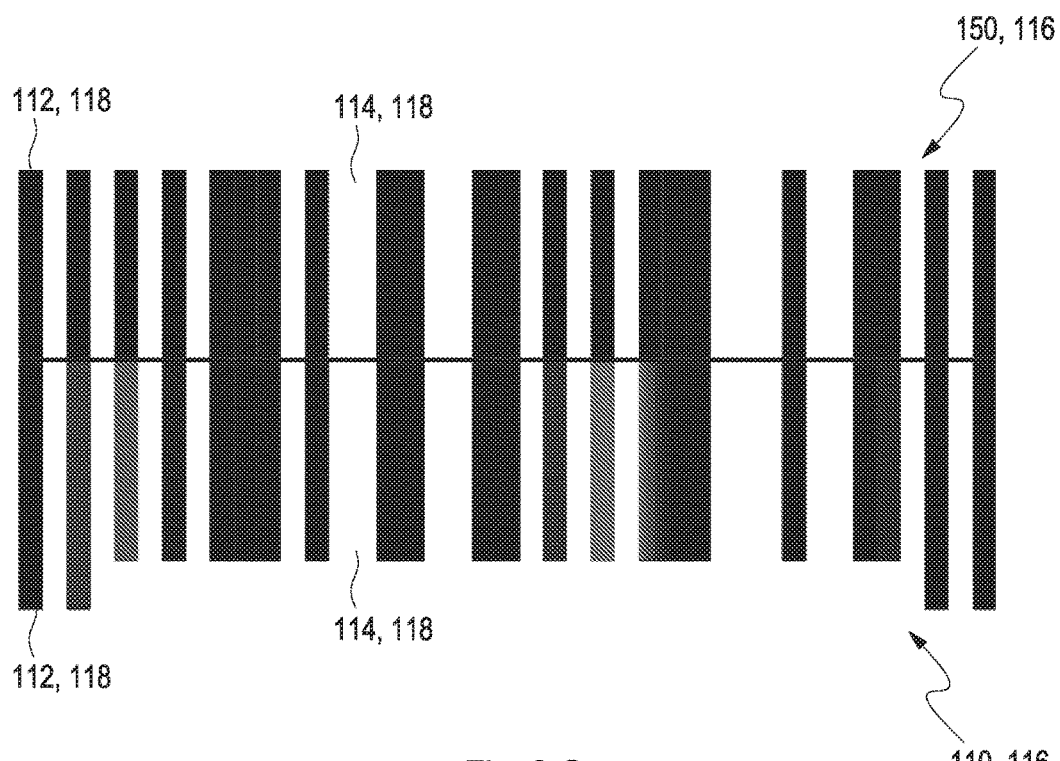
Figure 11:
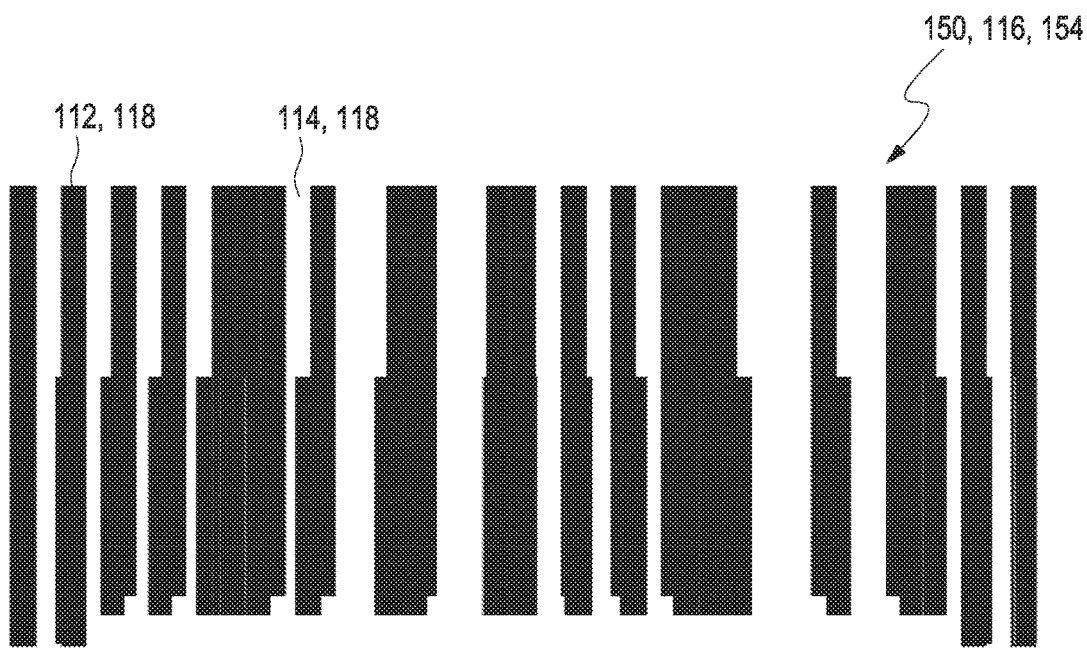
FIGS. 11A and 11B schematically present a picture of an actually printed version of a data matrix barcode (FIG. 11 A) and a barcode (FIG. 11B), wherein each version exhibits a deviation with regard to the predefined distance of the modules in the ideal image.
Figure 12:
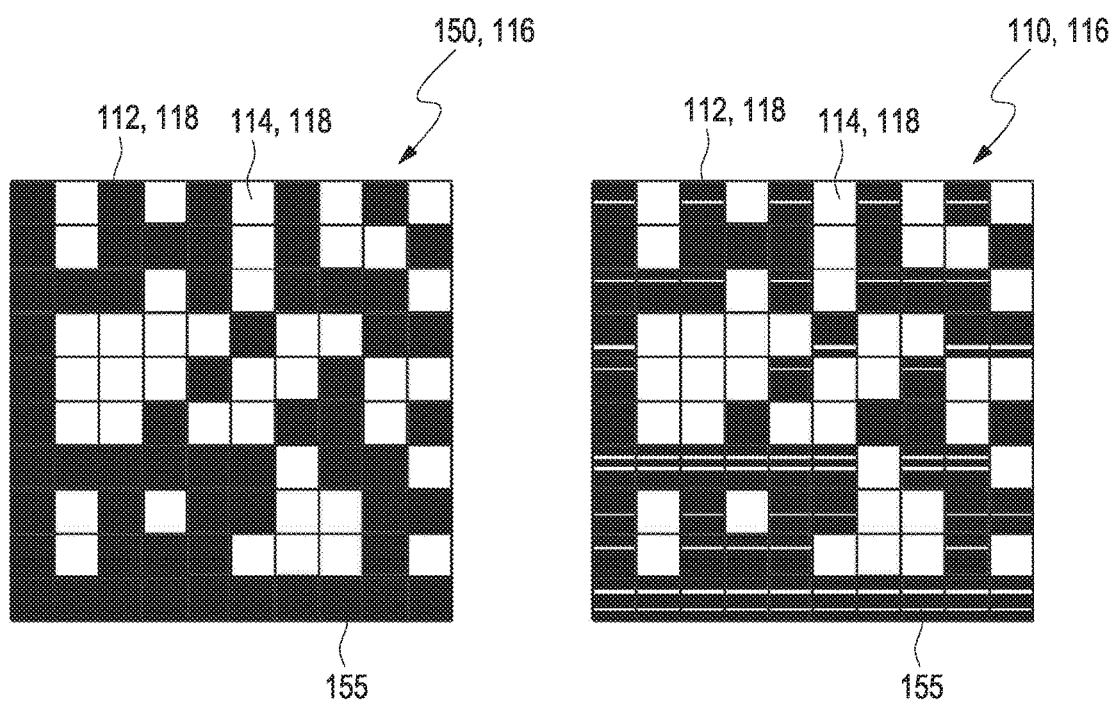
FIGS. 12A, 12B, 12C and 12D schematically show an ideal image of a data matrix barcode (FIG. 12A) and of a linear barcode (FIG. 12C), respectively, as well as a picture of an actually printed version of the data matrix barcode (FIG. 12B) and of a linear barcode (FIG. 12D), respectively, wherein the effectively printed area of the modules deviates from the area of the modules in the ideal image due to missing lines along the printed areas.
Figure 12:
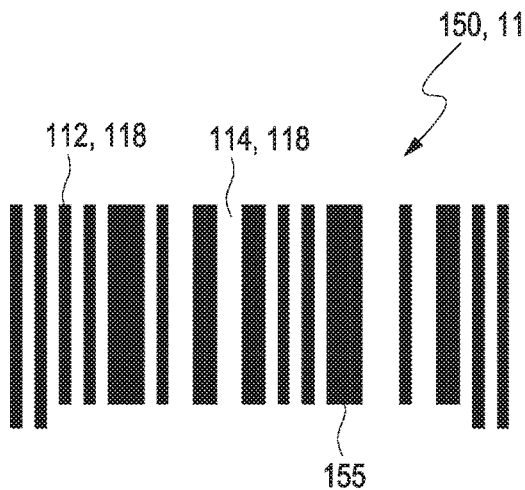
Figure 12:
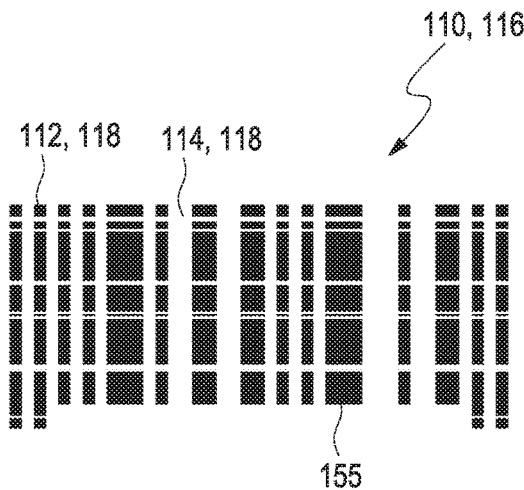
Figure 13:
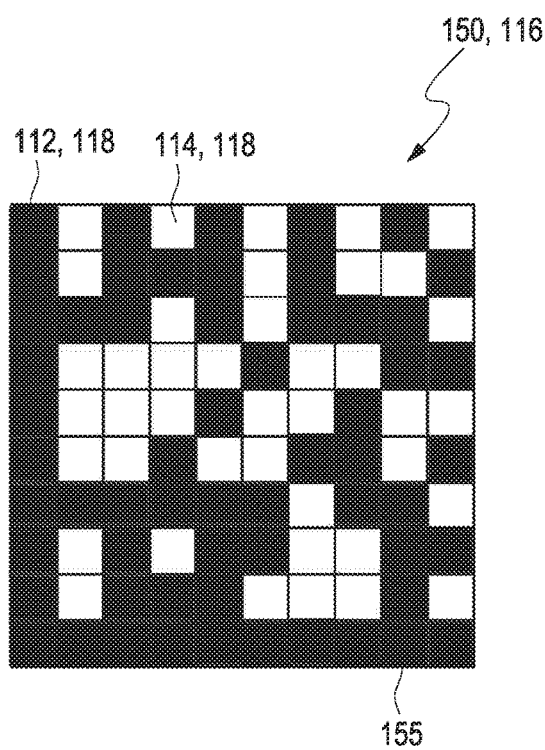
FIGS. 13A, 13B, 13C and 13D schematically depict an ideal image of a data matrix barcode (FIG. 13A) and of a linear barcode (FIG. 13C), respectively, as well as a picture of an actually printed version of the data matrix barcode (FIG. 13B) and of a linear barcode (FIG. 13D), respectively, wherein the effectively printed area of the modules deviates from the area of the modules in the ideal image due to vibrations arising at the end of the printing process.
Figure 13:
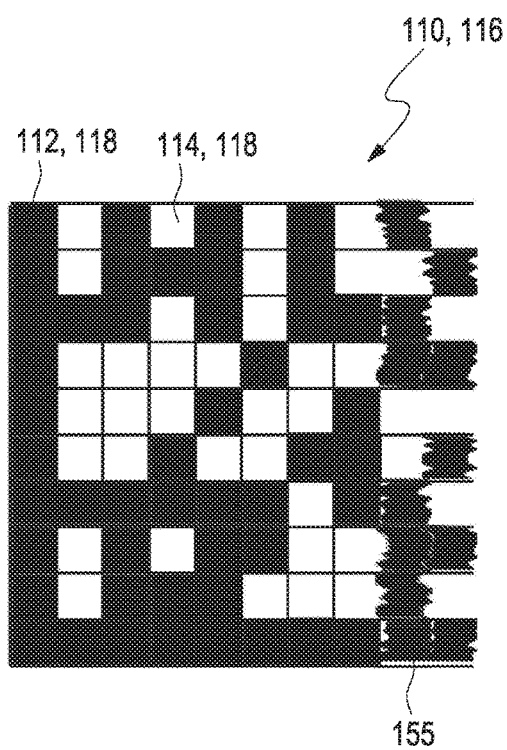
Figure 13:
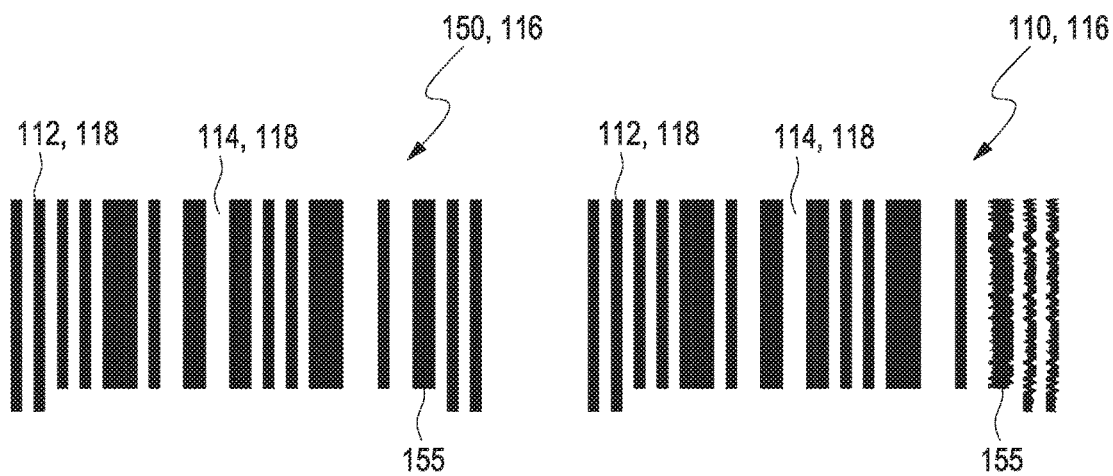

FIG. 1 shows a typical example of a picture 110 of a printed version of a data matrix barcode. The data matrix barcode is defined as a two-dimensional code which comprises a number of black modules 112 and a number of white modules 114 being arranged in a square or in a rectangular pattern 116. Hereby, the barcode which may be expressed in the pattern 116 is assigned to an item (not depicted here) in a manner that a data matrix barcode content related to the item is encoded within the plurality of modules 118. By this kind of representation, the data matrix barcode may allow identifying details about the related item, such as a manufacturer, a part number and a unique serial number, which may be together be referred to the barcode content of the item. A further example, such as schematically depicted in FIGS. 9C, 11B, 12C and D, 13C and D, and 14 A to C, may be a one-dimensional or linear barcode, wherein the number of black modules 112 and the number of white modules 114 are usually arranged in a linear pattern 116.

Figure 2:
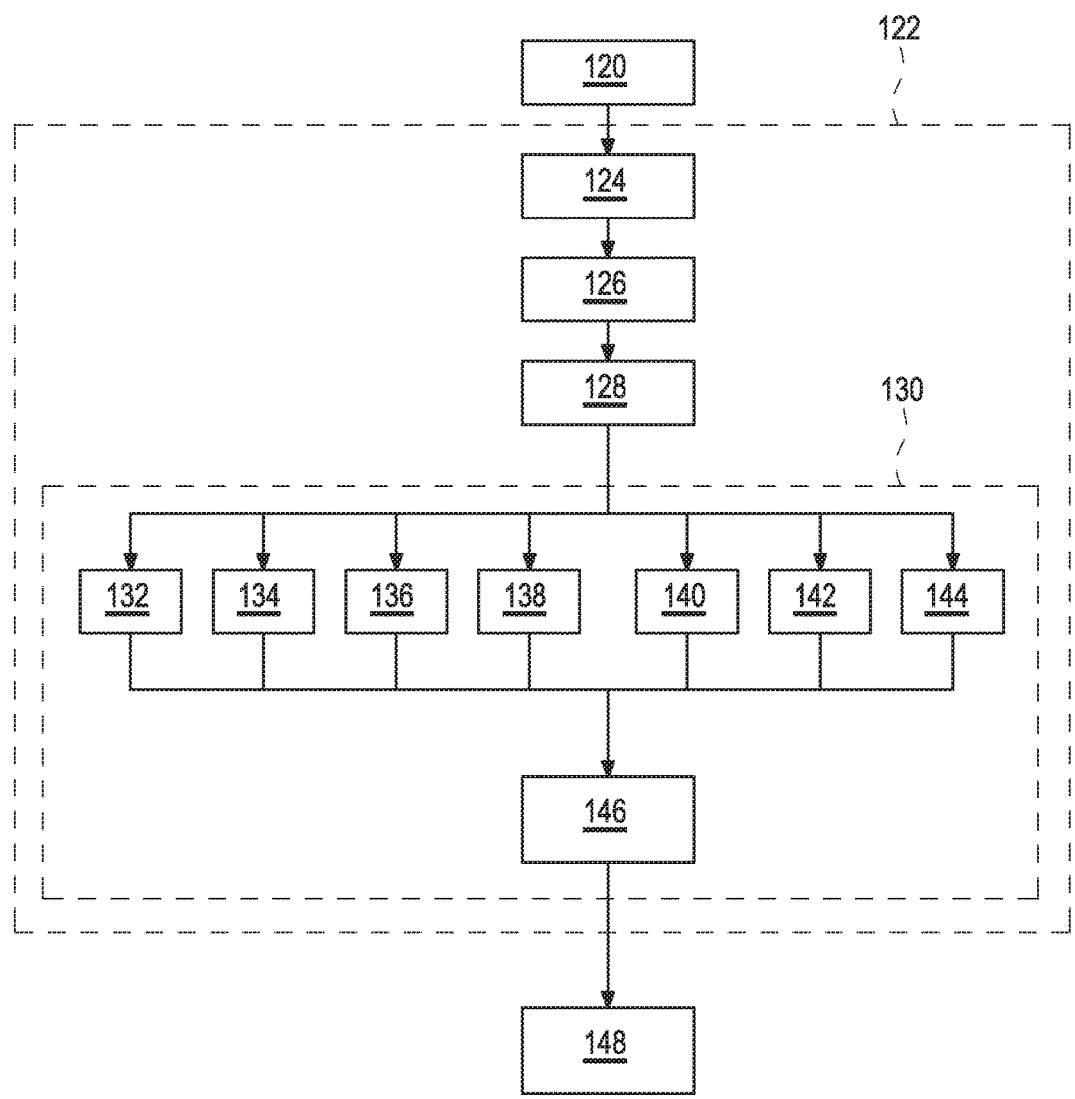
FIG. 2 presents a schematic overview over a preferred embodiment comprising the method for proving an authentication of an original item.

In FIG. 2, a preferred embodiment for the method for proving the authentication of the original item is drawn. For this purpose, first, within a providing step 120 a plurality of original items may be provided wherein the picture 110 of the printed version of each code may be printed onto the respective item. For this purpose, a code may be assigned to each item according to the set of rules, which, in this example, may be extracted from the standard specification which defines the data matrix barcode. Hereby, the data matrix barcode comprises a plurality of modules in such a manner that the barcode content of the item may be encoded within the plurality of modules.

Secondly, within a deriving step 122 an individual imperfection profile for each original item as provided during the previous providing step 120 may be derived. In this particular example, the deriving step 122 may comprise a number of sub-steps, which may be preferably performed according to the following order. Within a recording step 124, the printed version of the data matrix barcode may, according to step i), be recorded by means of an optical system. Thereafter, a modifying step 126 may be applied to the picture of the printed version of the code, which may comprise at least one of the following sub-steps:
locating the picture 110 of the printed version of the code;
rearranging a spatial orientation of the picture 110;
cutting or cropping the picture at least at one side and/or at one edge;
transforming the picture 110 into a binary format.
However, other sub-steps which may be suited for this purpose may be applied equally and/or alternatively.

Subsequently, the at least one barcode content referring to the item may, according to step ii), be decoded within a decoding step 128. Thereafter, within an analyzing step 130 according to step iii), the picture 110 of the printed version of the code, preferably the same picture 110 of the printed version of the code as previously used in the decoding step 128, may be used for acquiring an individual imperfection profile related to original printing device which has been actually used for printing the code onto the item. For this purpose, irregularities in the picture 110 of the printed version of the code may be analyzed by identifying at least one deviation in the picture 110 of the printed version of the code with respect to the ideal image as determined by an application of the set of rules to the data matrix barcode. In this preferred embodiment, this task may be performed by one or more of the following sub-steps:
determining a deviation 132 of the printed area size of the modules according to sub-step iii1);
determining a deviation 134 of the real grid as arranged onto the modules according to sub-step iii2);
determining a deviation 136 of the position of the modules with respect to their centers of gravity according to sub-step iii3);
determining a deviation 138 of a boundary line of the picture according to sub-step iii4);
determining a deviation 140 of the position of at least one sub-group of modules with respect to the centers of gravity according to sub-step iii5);
determining a deviation 142 with respect to the contrast of the modules according to sub-step iii6); and/or
determining a deviation 144 of the position of the modules with respect to raster points of an underlying and/or overprinted low-density image according to sub-step iii7).

Within a subsequent calculating step 146, further according to step iii) a numerical value which describes the individual imperfection profile of the original printing device may then be calculated.

Thus, as a result of performing the deriving step 122, the individual imperfection profile of the original printing device which may have been used to effectively print the data matrix barcode on the suspect item may be acquired, wherein the individual imperfection profile may preferably comprise at least one numeric value. Finally, in a storing step 148, according to step iv) the individual imperfection profile may be stored, in a first embodiment, by printing the individual imperfection profile onto the item and, in a second embodiment, additionally or alternatively by generating a database record for the item, wherein the database record comprises at least the barcode content and the individual imperfection profile being related to the original item.

Summarizing as described in FIG. 2, the preferred embodiment for the method for proving the authentication of the original item may, thus, comprise the following steps and/or sub-steps:
120 Providing step: providing a plurality of original items, wherein a code may be assigned to each item according to the set of rules, which may be extracted from the standard specification which defines the data matrix barcode;
122 Deriving step: deriving a individual imperfection profile of the original printing device for each item, wherein the deriving step may comprise the sub-steps 124 to 130 and 146;
124 Recording step: recording the picture 110 of the printed version of the data matrix barcode printed onto the item by means of an optical system;
126 Modifying step: modifying the picture 110 of the printed version of the code, which may comprise at least one of the following sub-steps:
locating the picture 110 of the printed version of the code;
rearranging a spatial orientation of the picture 110;
cutting or cropping the picture at least at one side and/or at one edge;
transforming the picture 110 into a binary format;
128 Decoding step: decoding the at least one barcode content referring to the item;
130 Analyzing step: analyzing irregularities in the picture by identifying at least one deviation in the picture 110 with respect to the ideal image, particularly by applying at least one of the sub-steps 132 to 144:

132 Determining a deviation of the printed the area of the modules;
134 Determining a deviation of the arrangement of the real grid;
136 Determining a deviation with respect to the position of the modules;
138 Determining a deviation of a boundary line;
140 Determining a deviation with respect to the position of at least one sub-group of modules;
142 Determining a deviation with respect to the contrast of the modules;
144 Determining a deviation concerning the position of the modules with respe
146 Calculating step: calculating a numerical value which describes the individual imperfection profile of the original printing device:
148 Storing step: Storing the individual imperfection profile by printing the individual imperfection profile onto the item and/or by generating a database record for the item, wherein the database record comprises at least the barcode content and the individual imperfection profile.

In FIGS. 3 to 14, a number of examples concerning various deviations between the ideal image, either the square pattern 116 of the data matrix code or the linear pattern of the barcode, and the picture 110 of the printed version of the respective code are presented which will be described in more detail.

Figure 3B:
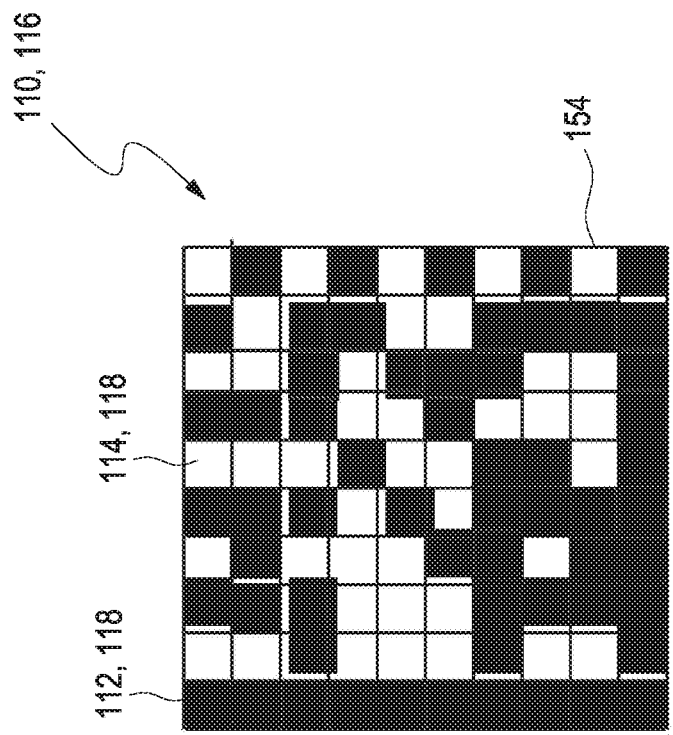
FIG. 3 schematically depicts an ideal image of a data matrix barcode (FIG. 3A) and a picture of an actually printed version of the data matrix barcode with irregularities which comprises a deviation of the effectively printed area of the modules with respect to their area in the ideal image (FIG. 3B)
Figure 3A:
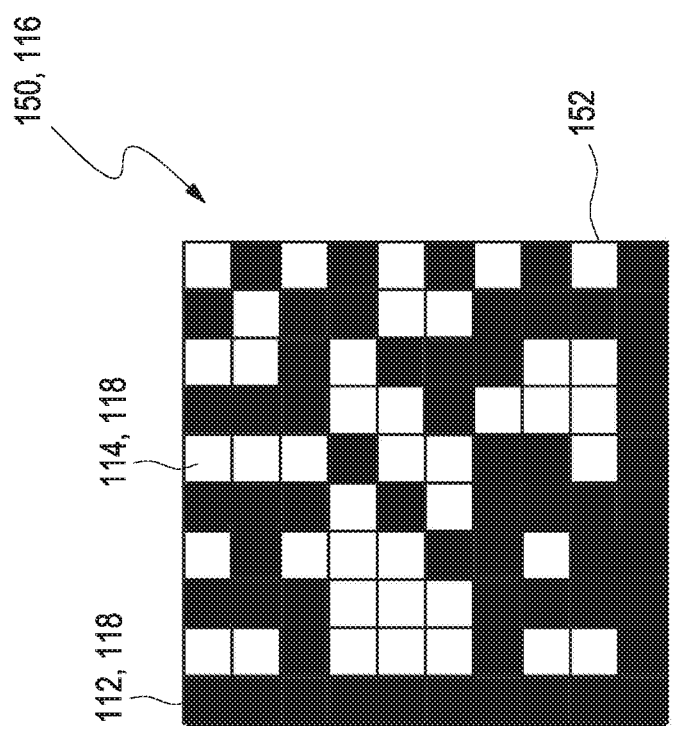

FIG. 3A schematically depicts the arrangement within an ideal image 150 of a data matrix barcode created by applying the set of rules as retrieved from the standard specification defining the data matrix barcode. In this particular example, a two dimensional ideal grid 152 as represented in FIG. 3A by two sets of parallel dashed lines which cross each other under an angle of 90° may form a square pattern 116 of a number of 10×10 modules 118 which are either black modules 112 or white modules 114.

In contrast hereto, FIG. 3B shows an actual real data matrix barcode, i.e. the picture 110 of the printed version of the data matrix barcode as effectively printed onto the item. The differences to the square pattern 116 of the ideal image 150 can be discovered at first sight, although in this particular example a real grid 154 remains identical with the ideal grid 152 and only a positional deviation between the pattern 116 of the code in the ideal image 150 and in the picture 110 of the printed version of the code has occurred. However, although omitted for sake of clarity, other kinds of deviations with respect to the ideal image 150 may further be observed.

According to sub-step iii1), the deviation between an area 155 of the modules 118 as effectively printed in the picture 110 of the printed version of the code in FIG. 3B with respect to the area 155 of the modules 118 in the ideal image 150 in FIG. 3A may be determined. Whereas in the ideal image 150, all modules 118 perfectly fit inside the ideal grid 152, in the picture 110 of the printed version of the code, some modules 118 may be slightly shifted with respect to the real grid 154. Hereby, the area 155 of the modules 118 inside its corresponding place within the real grid 154 may, for example, be determined by integrating the area, such as by computing a percentage of the area being effectively printed. Further examples for deviations in a sense according to sub-step iii1) may be found in FIGS. 10, 12, 13 and 14.

Like FIG. 3B, FIG. 4A displays a real data matrix barcode, i.e. the picture 110 of the printed version of the data matrix barcode as effectively printed onto the item. However, in this example, the differences to the square pattern 116 of the ideal image 150 here comprise a distortion of the ideal grid 152 of the ideal image 150 into the real grid 154 of the picture 110 of the printed version of the code.

Consequently, FIG. 4B schematically depicts, as an example, one set of parallel lines which form the real grid 154 in one of the two dimensions of the data matrix barcode. Herein, the lines of the real grid 154 may be tilted in a positive (+) direction or in a negative (−) direction with respect to the lines in the ideal grid 152 or may be identical with the lines in the ideal grid 152. The same phenomenon may be observed in the other set of parallel lines in the second dimension.

According to sub-step iii2), the deviation between the real grid 154 as effectively printed in the picture 110 of the code and the ideal grid 152 in the ideal image 150 may be determined by the best fitting set of lines with respect to the boundary lines of each module 118. Hereby, a succession of the values of the tilting directions may create a unique representation with respect to the picture 110 of the printed version of the code, wherein the values of the tilting directions may be determined separately for both dimensions. Further examples for deviations in a sense according to sub-step iii2) may be found in FIGS. 11 and 14.

FIG. 5A displays the ideal center of gravity 156 for the module 118 within the ideal image 150 of a data matrix barcode which may exactly be located in the center of each square 116 as defined by the ideal grid 152 in the ideal image 150 of the data matrix barcode. In contrast hereto, as schematically displayed in FIG. 5B, the real center of gravity 158 of the same module 118 in the picture 110 may no longer be at the position of the ideal center of gravity 156 of the same module 118 in the ideal image 150.

According to sub-step iii3), the deviation between the real a center of gravity 158 of the module 118 as effectively printed in the picture 110 as presented in FIG. 5B with respect to the ideal center of gravity 156 of the same module 118 in the ideal image 150 as depicted in FIG. 5A may be determined by taking into account that the module 118 may only be printed inside its respective boundaries as defined by the ideal grid 152. Consequently, if the effectively printed module 118 may be crossing a line as comprised in the ideal grid 152, the part of the module 118 which may be located outside its boundaries as defined by the ideal grid 152 may be assumed to belong to a different module. Hereby, the real center of gravity 158 of the module 118 may be determined by a known method applicable to calculate the center of gravity of a geometrical figure. By determining this kind of deviation for each module 118, a vector may be defined, wherein the resulting set of vectors may be considered as unique for the picture 110 of the printed version of the code.

Figure 6:
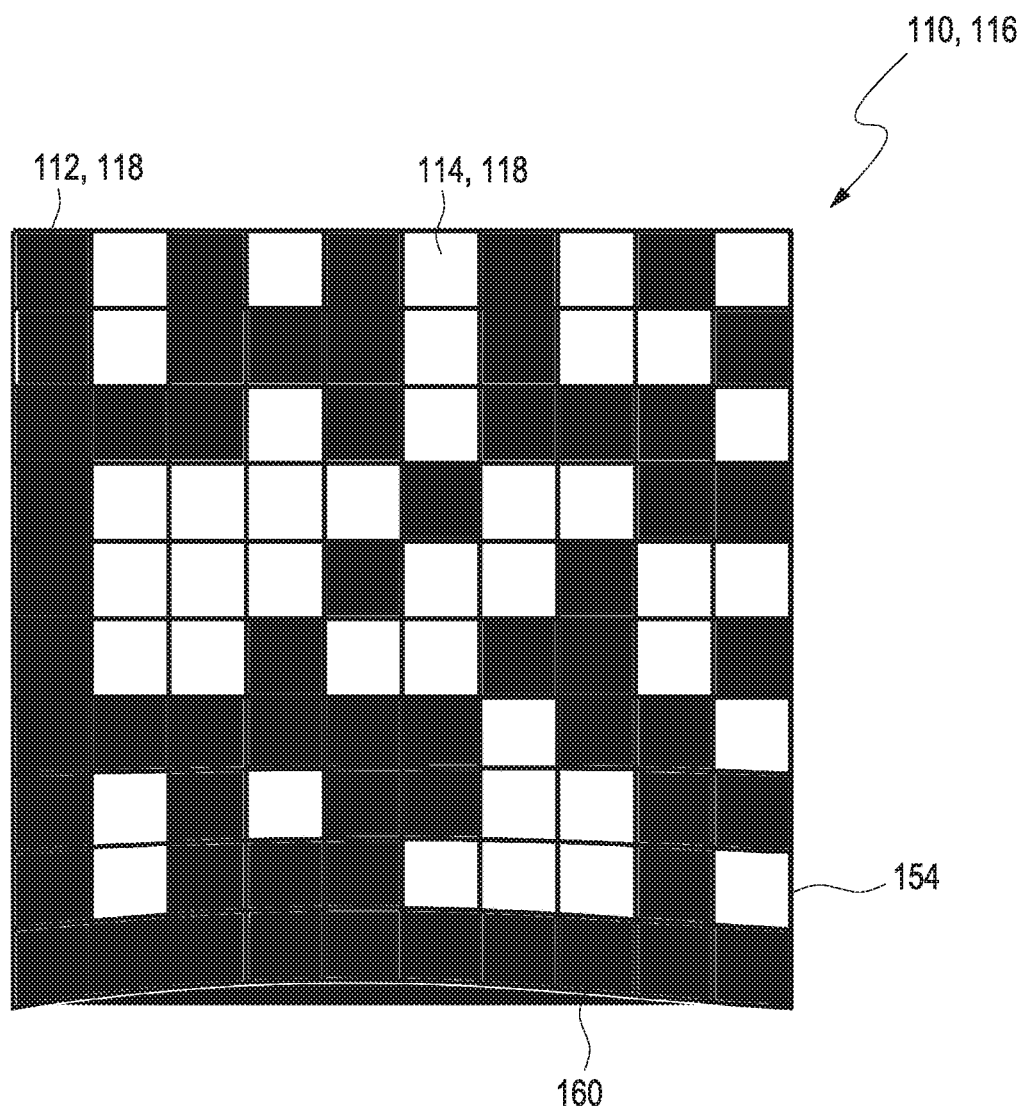
FIG. 6 schematically depicts a curvature under the L finder pattern in the effectively printed picture of a data matrix barcode.

FIG. 6 schematically shows a boundary curve 160 as effectively printed in the picture 110 of the code which deviates from a straight line in the ideal image 150 as for example shown in FIGS. 3A and 5A. Herein, the deviation comprises a geometrical difference by which the boundary curve 160 within the picture 110 may deviate from an ideal straight line in the ideal image 150. During the printing process, the bottom line of the L-finder pattern in the data matrix code as shown in FIG. 6 has not been printed as a straight line but as the boundary curve 160. According to sub-step iii4), a combination of the curvature and the highest point of the boundary curve 160 may be considered as unique for the picture 110 of the printed version of the code.

Figure 7B:
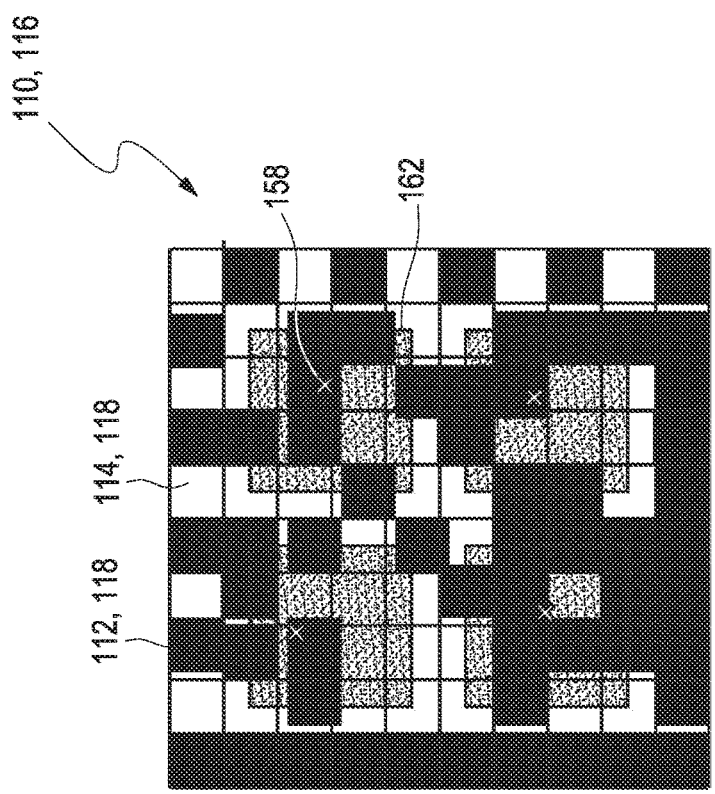
FIGS. 7A and 7B schematically show the ideal centers of gravity of four separate sub-groups of modules in the ideal image (FIG. 7A) and the real centers of gravity of the same sub-groups of modules in the effectively printed picture of the data matrix barcode (FIG. 7B)
Figure 7A:
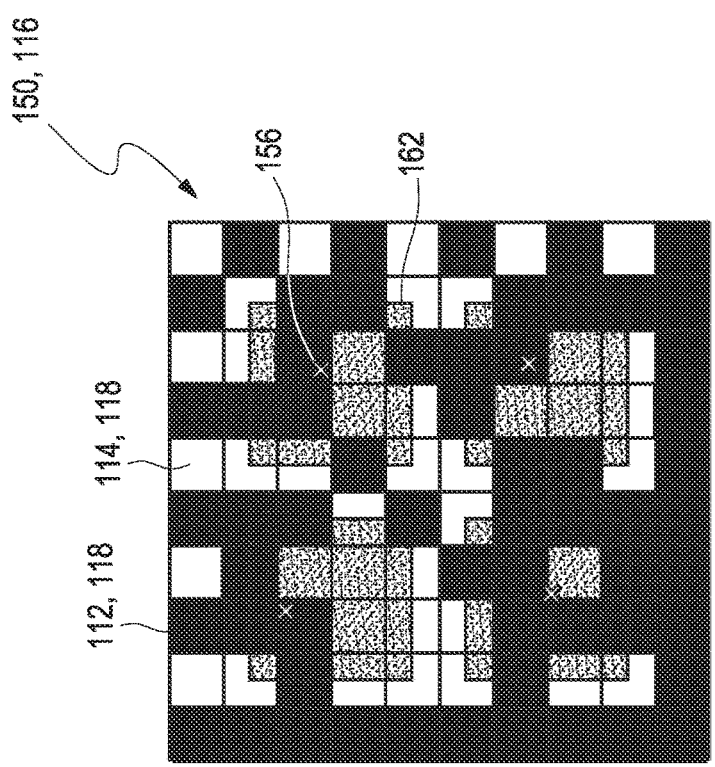

FIG. 7A displays the ideal center of gravity 156 for a sub-group 162 of modules within the ideal image 150 of a data matrix barcode, wherein the sub-group 162 here comprises a number of adjacent modules located together within a part of the ideal image 150. In contrast hereto, as schematically displayed in FIG. 7B, the real center of gravity 158 of the same sub-group 162 of modules in the picture 110 of the printed version of the code may no longer be at the position of the ideal center of gravity 156 of the same sub-group 162 of modules. According to sub-step iii5), the deviation between the real a center of gravity 158 of the sub-group 162 of modules as effectively printed in the picture 110 as presented in FIG. 7B with respect to the ideal center of gravity 156 of the same sub-group 162 of modules in the ideal image 150 as depicted in FIG. 7A may be determined as described above. By determining this kind of deviation for each module 118 a vector may be defined, wherein the resulting set of vectors may be considered as unique for the picture 110 of the printed version of the code.

Figure 8:
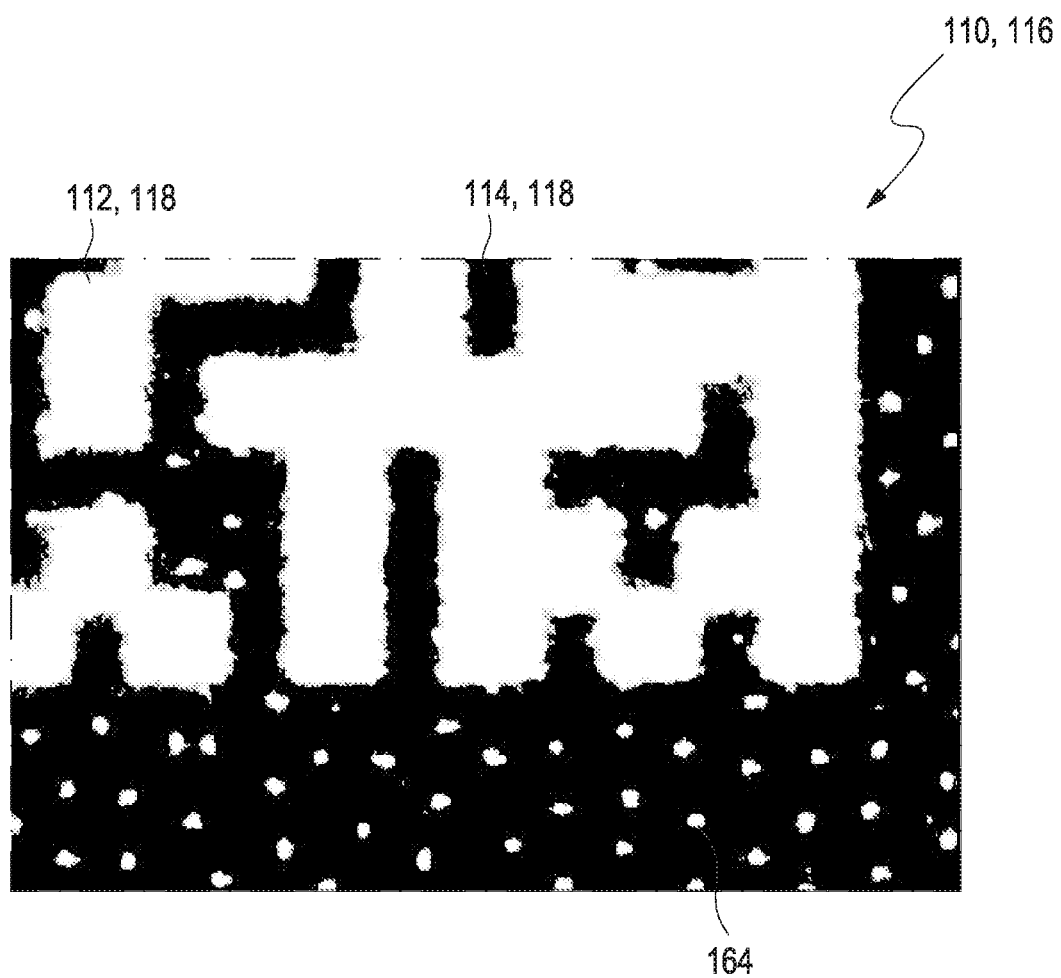
FIG. 8 schematically presents a number of raster points belonging to a low-density image underlying the effectively printed picture of the data matrix barcode.

FIG. 8 displays an example of a picture 110 of the printed version of the code which comprises a number of raster points 164 belonging to an underlying and/or an overprinted low-density image. As described above, the printing device may provide an underlying and/or an overprinted low-density image which may comprise a pattern of raster points 164, wherein, according to sub-step iii7), the position of the raster points 164 with respect to the ideal grid 152 in the ideal image 150 may be suitably used for authentication purposes.

FIG. 9A schematically shows an ideal image 150 of a data matrix barcode which is a compared with the picture 110 of an actually printed version of the data matrix barcode according to FIG. 9B, wherein the irregularities comprise a deviation 142 with respect to a contrast in the module. Further, in FIG. 9C a comparison between the ideal image 150 of a linear barcode (upper half of FIG. 9C) and a picture 110 of an actually printed version of the linear barcode with irregularities with respect to the contrast (lower half of FIG. 9C) are schematically depicted. Whereas in the ideal image 150 of the code the number of black modules 112 are evenly printed by the printing device in a pattern, in particular in a linear, a square or a rectangular pattern 116, thus providing the result that a single black tone and a single white tone exists preferably over the whole pattern 116, according to sub-step iii6), the picture 110 of the actually printed version of the code may exhibit a weak, but optically discernible difference in contrast between two different modules 118 as illustrated in FIG. 9B for the example of a data matrix barcode and in the lower half of FIG. 9C for the example of a linear barcode. In order to derive an individual imperfection profile of the printing device, the contrast may be adjusted for each module 118 in the actually printed version of the code, wherein the adjustment as required for each respective module may be taken into account for this purpose.

FIG. 10A schematically depicts an ideal image 150 of a data matrix barcode, whereas FIG. 10B) shows a picture 110 of an actually printed version of the data matrix barcode, wherein the effectively printed area 155 of the modules 118 deviates, according to sub-step iii1), from the area 155 of the modules 118 in the ideal image 150 due to printing ink which may be missing between adjacent modules 118, thus reducing the printed area 155 in the picture 110 with respect to the corresponding area 155 in the ideal image 150. Particularly since a number of printing devices apply the printing ink in form of geometrical figures which may not exhibit a rectangular or a square form, such as a circle or an oval, which may, thus, in the picture 110 of the printed version of the code result in locations without printing ink, particular at contact points 165 of adjacent black modules 112, 118, such as in the contact point 165 of two, three or four adjoining black modules 112, 118 as, for example shown in FIG. 10B, which, if necessary, together with a required number of white modules 114, 118, form a square.

FIG. 11A schematically presents a picture 110 of an actually printed version of a data matrix barcode, while FIG. 11B shows a picture 110 of an actually printed version of a linear barcode. In both examples, a deviation according to sub-step iii2) with regard to the ideal grid 152 in terms of a predefined distance of the modules 118 in the ideal image 150 as, for example, depicted in FIG. 9A for data matrix barcode and in the upper half of FIG. 9C for the linear barcode, may be observed. Mainly due to non-constant speed of the printing process during an application of the printing ink onto the item, the real grid 154 in the picture 110 of the actually printed version of the code may exhibit differing distances between different modules 118, such as with respect to their location and/or their width, particularly in printing direction.

FIGS. 12A and 12C schematically show an ideal image 150 of a data matrix barcode (FIG. 12A) and of a linear barcode (FIG. 12C), respectively. In contrast hereto, FIGS. 12B and 12D each display a picture 110 of an actually printed version of the data matrix barcode (FIG. 12B) and of a linear barcode (FIG. 12D), respectively, wherein, according to sub-step iii 1), the effectively printed area 155 of the modules 118 deviates from the area 155 of the modules 118 in the ideal image 150 due to at least one missing line along the printed area, particularly in printing direction. Such a kind of deviation may be a result from a printing device which comprises at least one nozzle that may be clogged and, thus, may at least only partially contribute to the application of printing ink onto the item. Within this regard, the individual imperfection profile of the printing device may be derived from a parameter related to the at least one missing line, such as a width and/or a position of the missing line.

FIGS. 13A and 13C schematically show an ideal image 150 of a data matrix barcode (FIG. 13A) and of a linear barcode (FIG. 13C), respectively. In contrast hereto, FIGS. 13B and 13D each display a picture 110 of an actually printed version of the data matrix barcode (FIG. 13B) and of a linear barcode (FIG. 13D), respectively, wherein, according to sub-step iii1), the effectively printed area 155 of the modules 118 deviates from the area 155 of the modules 118 in the ideal image 150 due to vibrations arising during the printing process, in particular at the end of the printing process, thus, resulting in a rather poor quality of the corresponding modules 118 which may exhibit a distorted form at the respective locations within the pattern 116. Also here, the individual imperfection profile of the printing device may be derived from a location related to the at least one distorted module within the pattern 116.

Figure 14:
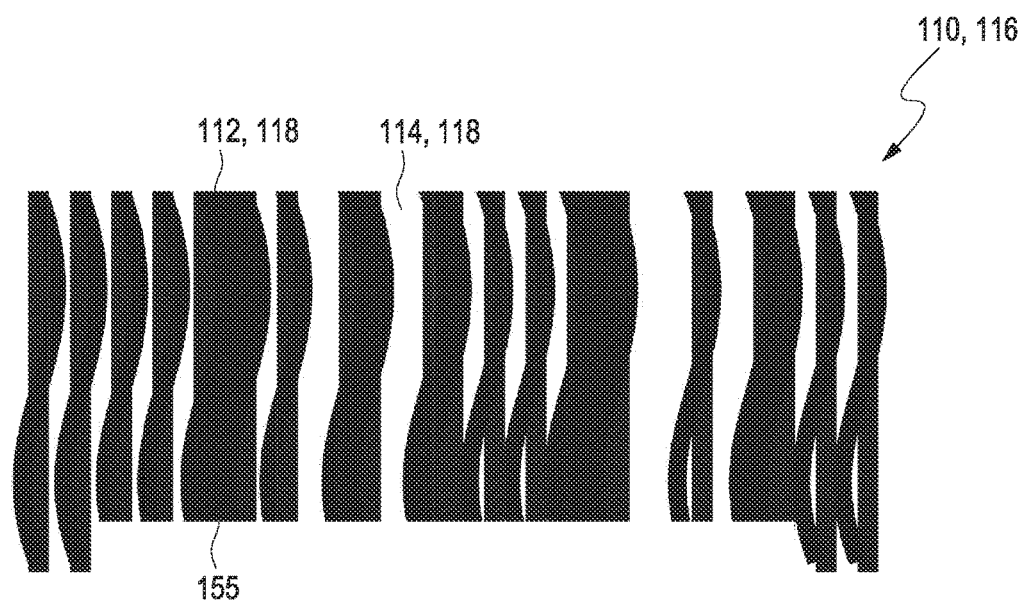
FIGS. 14A, 14B, 14C, 14D and 14E schematically present pictures of actually printed versions of linear barcodes, wherein the bars of the barcode exhibit a sinusoidal shape (FIG. 14A), wherein the bars of the barcode exhibit a trapezoidal shape (FIG. 14B), and wherein the shape of the bars of the barcode is composed of hundreds of small, irregular bubbles (FIG. 14C); wherein an optical property is recorded along at least one curve through the barcode (FIGS. 14D and 14E)
Figure 14:
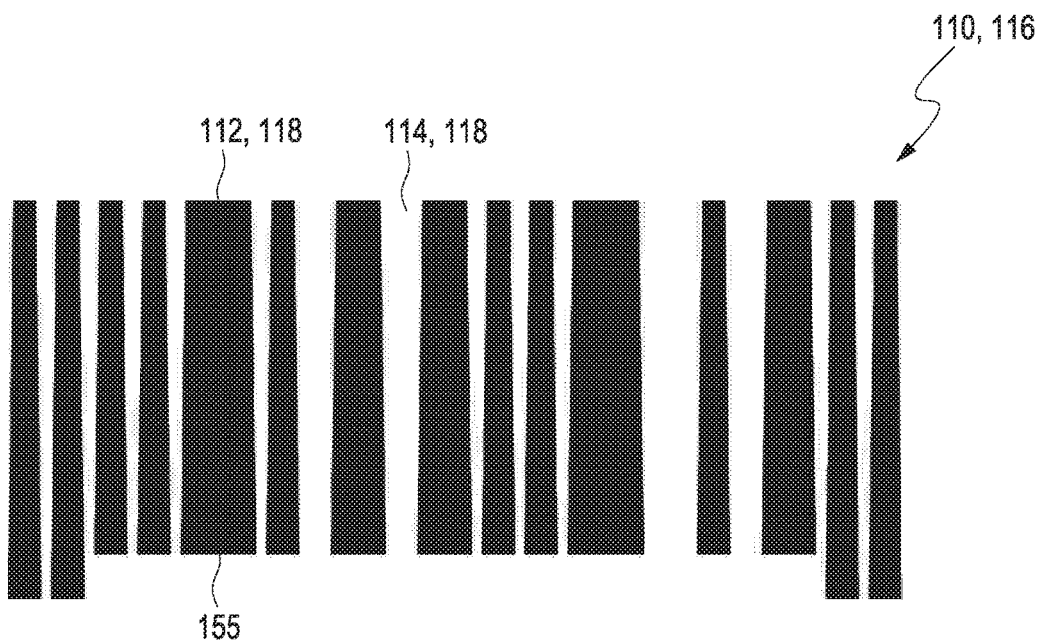
Figure 14:
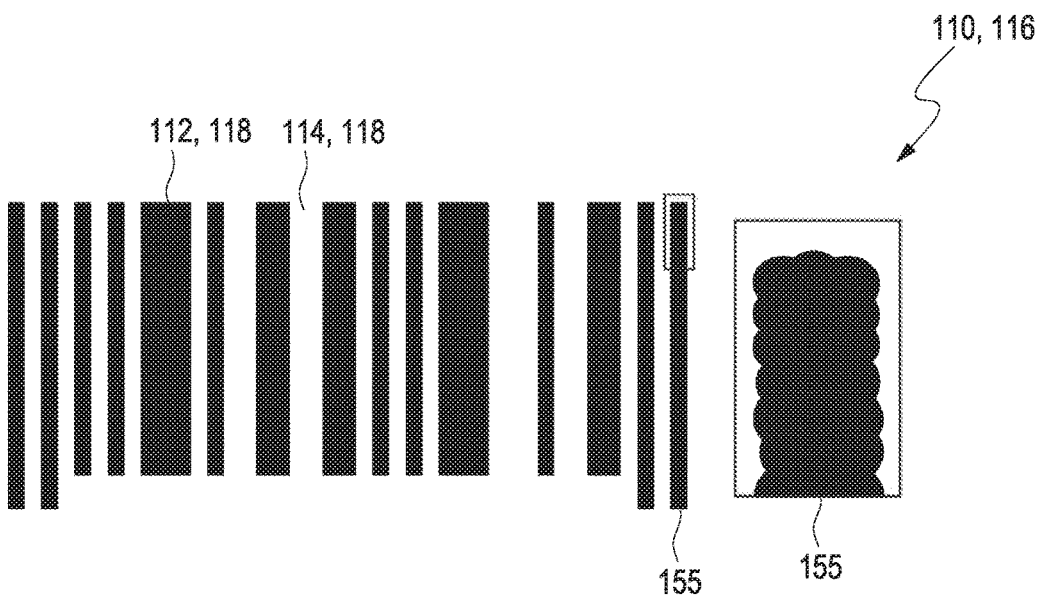
Figure 14:
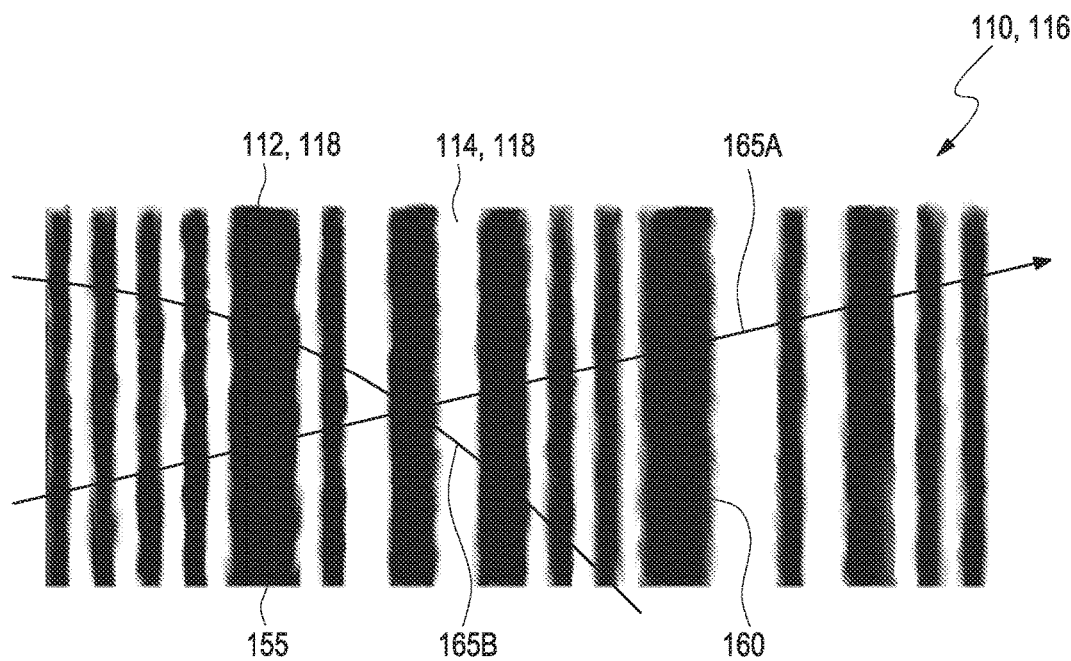
Figure 14:
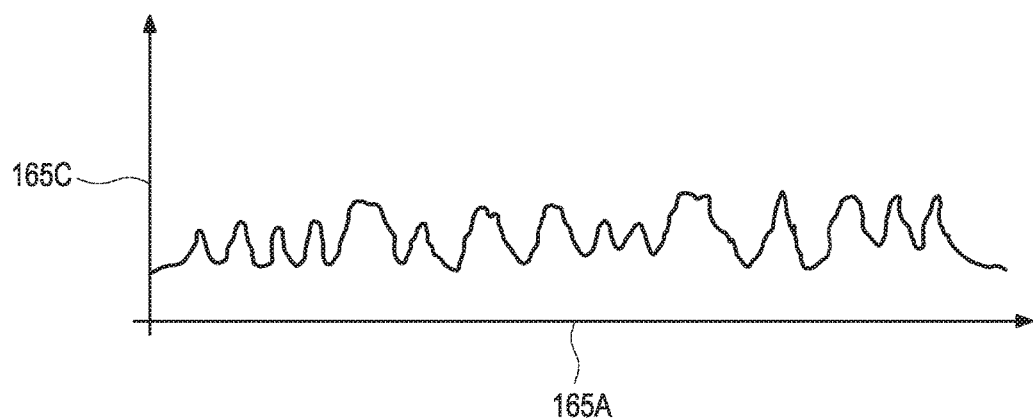

Finally, FIG. 14 schematically presents pictures 110 of actually printed versions of linear barcodes which may constitute a deviation according to sub-step iii1) with regard to the area 155 of the modules 118 in the ideal image 150 and/or according to sub-step iii2) with regard to the ideal grid 152 and/or according to sub-step iii4) with regard to the boundary curve 160. Whereas a bar in the ideal image 150 has as, for example, shown in FIG. 13C, a perfect linear shape, each bar in the picture 110 of the actually printed versions of the linear barcode in FIG. 14A exhibits a sinusoidal variation along its extension which may, alternatively or additionally, be employed for deriving the individual imperfection profile of the printing device from a parameter in relationship to the sinusoidal variation. Further, while the bar in the ideal image 150 has a perfect rectangular shape, each bar in the picture 110 of the actually printed versions of the linear barcode in FIG. 14B displays a trapezoid variation of the diameter of the bars with an increasing diameter towards the lower bottom of each bar, which may, alternatively or in addition, be employed for deriving the individual imperfection profile of the printing device from a parameter related to the trapezoidal variation. Further, in particular in a high-resolution image, the shape of the bars of a barcode in a picture 110 may be composed of a large number of small, irregular bubbles, as schematically depicted in FIG. 14C. Herein, the bubble may be arranged highly irregular in a manner that at least one boundary curve 160 of a bar may constitute a parametric curve, whose parameters may be employed in deriving the individual imperfection profile of the printing device.

Further, each bar in the picture 110 of the actually printed version of the linear barcode in FIG. 14D may exhibit an individual diffuse shape which might reveal a specific blurred boundary curve 160 for each bar. This observation may be taken into account for determining the individual imperfection profile of the printing device by, additionally, recording an optical property, such as a brightness, a refraction, or a transmission, along a curve, preferably a straight line 165A or a curved line 165B which may, preferably, be arranged in a manner that it might intersect each bar in an angle which may depend on an allocation of most dominant defects as schematically depicted in FIG. 14D. The corresponding result is schematically shown in FIG. 14E, wherein an intensity 165C of the respective optical property may be displayed as recorded along the straight line 165A (as shown in FIG. 14E) or along the curved line 165B (not depicted here). Whereas each bar in the ideal image 150 as for example shown in FIG. 13C, has a perfect linear shape and would, thus, produce a rectangular function in a diagram, in which the intensity 165C of the selected optical property might be displayed along the straight line 165A (as shown in FIG. 14E) or along the curved line 165B (not depicted here), each bar in the picture 110 of the actually printed versions of the linear barcode in FIG. 14D can comprise an individual shape which may result in an individual signature which might exhibit a deviation from the rectangular function as depicted in FIG. 14E. Consequently, the deviation from the rectangular function may be employed for calculating a numerical value, which may be used for describing the individual imperfection profile of the printing device.

In FIGS. 15A to 15C, three different preferred embodiments with respect to the method for determining the authentication status of the suspect item are presented.

The embodiment as described in FIG. 15A, starts with the recording step 124 during which according to step a) at least one picture 110 of the printed version of the code may be recorded with an optical system. Thereafter, the picture 110 may undergo a modifying step 126 which has been described elsewhere in more detail. With the subsequent decoding step 128, the at least one barcode content of the item may, according to step b), be decoded from the picture 110 according to the set of rules. According to step c), after performing the analyzing step 130 which may provide irregularities in the picture 110 of the printed version of the code by identifying at least one deviation in the picture 110 with respect to the ideal image 150, a numerical value which describes the individual imperfection profile of the original printing device may be calculated in a calculating step 146. The individual imperfection profile of the suspect item as determined within the previous calculating step 146 may then be transmitted within a transmission step 166 to a data processing unit via a computer network. Thereafter, within a selecting step 168, the barcode content may be used to select a database record and, thus, obtain the individual imperfection profile of the original item which may be related to the item. The individual imperfection profile of the original item may then, according to step d), be used within a comparing step 170 in order to compare the individual imperfection profile of the suspect item with the individual imperfection profile of the original item, by which comparison an authentication status 172 of the suspect item may be determined and subsequently returned in a returning step 174 to a control unit which requests this kind of information.

Summarizing as described in FIG. 15A, the first preferred embodiment for the method for determining the authentication status 172 of the suspect item 180 may comprise the following steps:

124 Recording step: recording the picture 110 of the printed version of the data matrix barcode printed onto the item by means of an optical system;

126 Modifying step: modifying the picture 110 of the printed version of the code;

128 Decoding step: decoding the at least one barcode content referring to the item;

130 Analyzing step: analyzing irregularities in the picture 110 by identifying at least one deviation in the picture 110 with respect to the ideal image;

146 Calculating step: calculating a numerical value which describes the individual imperfection profile of the suspect item;

166 Transmission step: transmitting the individual imperfection profile of the suspect item to a data processing unit via a computer network;

168 Selecting step: obtaining the individual imperfection profile of the original item related to the item by typically using the barcode content to select a database record;

170 Comparing step: comparing the individual imperfection profile of the suspect item with the individual imperfection profile of the original item and determining the authentication status 172 of the suspect item;

174 Returning step: returning the authentication status 172 of the suspect item to a control unit requesting this kind of information.

According to FIG. 15B, within the second preferred embodiment for determining the authentication status of 172 the suspect item only the recording step 124, the modifying step 126, and the decoding step 128, may be performed locally until the modified picture 110 of the printed version of the code is transmitted within the transmission step 166 to the data processing unit via the computer network, where the remaining steps, including the analyzing step 130, the calculating step 132, the selecting step 168, the comparing step 170, and the returning step 174 may be performed. By this procedure, the second embodiment may provide the authentication status 172 of the suspect item.

Summarizing as described in FIG. 15B, the second preferred embodiment for the method for determining the authentication status 172 of the suspect item 180 may comprise the following steps:

124 Recording step: recording the picture 110 of the printed version of the data matrix barcode printed onto the item by means of an optical system;

126 Modifying step: modifying the picture 110 of the printed version of the code;

128 Decoding step: decoding the at least one barcode content referring to the item;

166 Transmission step: transmitting the modified picture of the printed version of the code to a data processing unit via a computer network;

130 Analyzing step: analyzing irregularities in the picture by identifying at least one deviation in the picture with respect to the ideal image;

146 Calculating step: calculating a numerical value which describes the individual imperfection profile of the suspect item;

168 Selecting step: obtaining the individual imperfection profile of the original item related to the item by typically using the barcode content to select a database record;

170 Comparing step: comparing the individual imperfection profile of the suspect item with the individual imperfection profile of the original item and determining the authentication status 172 of the suspect item;

174 Returning step: returning the authentication status 172 of the suspect item to a control unit requesting this kind of information.

Finally, a third embodiment as schematically depicted in FIG. 15C may also provide the authentication status 172 of the suspect item. In this particular embodiment, only the recording step 124 may locally be performed before the picture 110 of the printed version of the code may be transmitted, with the transmission step 166, to the data processing unit via the computer network, whereas the remaining steps, including the modifying step 126, the decoding step 128, the analyzing step 130, the calculating step 132, the selecting step 168, the comparing step 170, and the returning step 174 may be performed.

Summarizing as described in FIG. 15C, the third preferred embodiment for the method for determining the authentication status 172 of the suspect item 180 may comprise the following steps:

124 Recording step: recording the picture 110 of the printed version of the data matrix barcode printed onto the item by means of an optical system;

166 Transmission step: transmitting the picture 110 of the printed version of the code to a data processing unit via a computer network;

126 Modifying step: modifying the picture 110 of the printed version of the code;

128 Decoding step: decoding the at least one barcode content referring to the item;

130 Analyzing step: analyzing irregularities in the picture by identifying at least one deviation in the picture with respect to the ideal image;

146 Calculating step: calculating a numerical value which describes the individual imperfection profile of the suspect item;

168 Selecting step: obtaining the individual imperfection profile of the original item related to the item by typically using the barcode content to select a database record;

170 Comparing step: comparing the individual imperfection profile of the suspect item with the individual imperfection profile of the original item and determining the authentication status 172 of the suspect item;

174 Returning step: returning the authentication status 172 of the suspect item to a control unit requesting this kind of information.

Which of the three mentioned preferred embodiments or any further embodiments may be employed in a specific situation, might largely depend on the technical setup as well as on the purpose and/or the intention of the user. Within this regard it is mentioned that the item which may be actually transmitted to a data processing unit via a computer network may depend on the position of the transmission step 166 within the series of the steps to be performed within each such embodiment.

Figure 16:
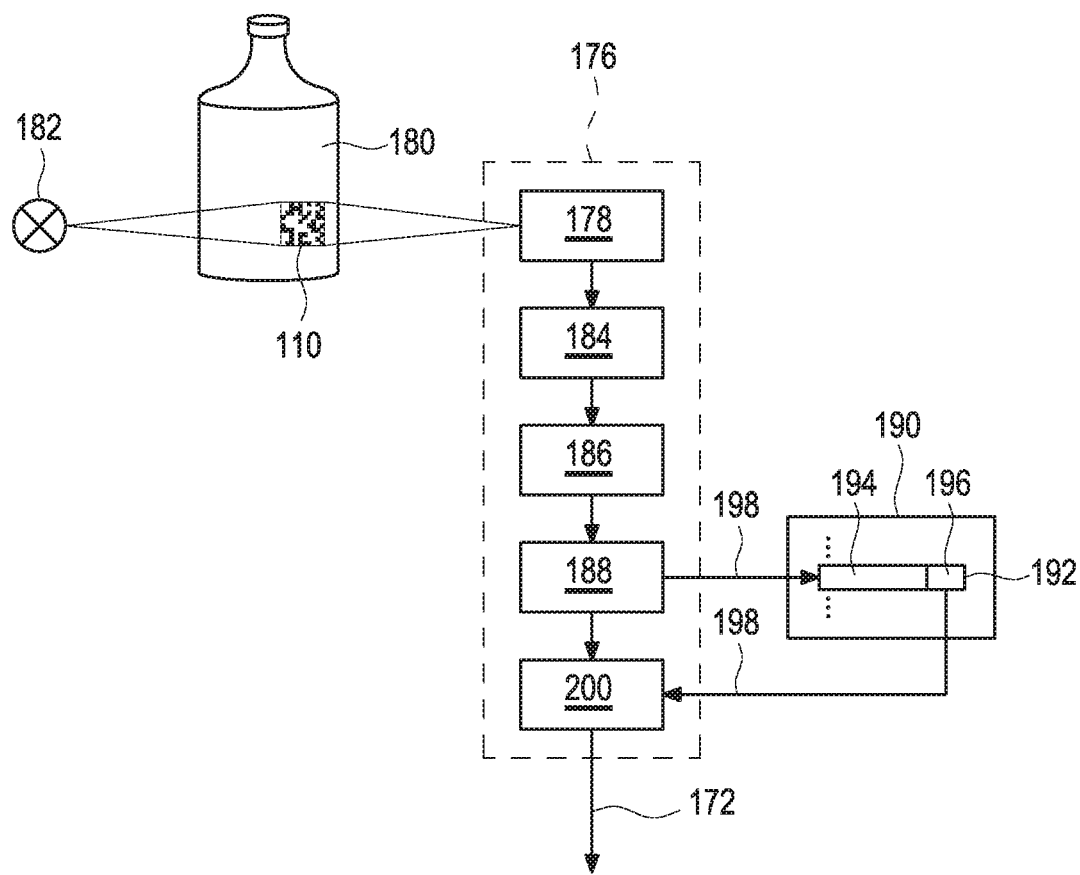
FIG. 16 presents a schematic layout of a preferred embodiment of an authentication apparatus for determining an authentication status of a suspect item.

FIG. 16 schematically depicts a preferred authentication apparatus 176 which is configured for performing the method for determining the authentication status 172 according to the first embodiment as schematically presented in FIG. 15A. Here, a recording device 178 may, according to part A), be configured for recording the picture 110 of the printed version of a data matrix barcode which may have been printed onto an item 180, such as a bottle which might comprise a pharmaceutical preparation. Hereby, the recording of the picture 110 may be supported by a light source 182 which may illuminate the picture.

The authentication apparatus 176 may, according to part B), further comprise a decoding device 184 which may be configured for decoding the at least one barcode content from the picture 110 of the printed version of the code according to the set of rules applicable to the data matrix barcode. A further part of the authentication apparatus 176 may, according to part C), be the analyzing device 186 configured for analyzing irregularities in the picture 110 in order to derive the at least one individual imperfection profile of the printed version of the code as printed on the suspect item 180.

The authentication apparatus 176 may further comprise a selecting device 188 configured for selecting, within a database 190, a database record 192 by using the barcode content to search for a database content 194 and also configured for obtaining an individual imperfection profile 196 of the original item 180 from the database record 192, wherein the individual imperfection profile 196 of the original item 180 comprises a numeric value. In this particular embodiment, the database may be accessible via a transmission line 198 by which data may be transmitted from the selecting device 188 to the database 190 and by which the individual imperfection profile 196 of the original item 180 is returned back to the comparing device 200 being configured, according to part D), for comparing the individual imperfection profile 196 of the suspect item 180 as obtained by means of the analyzing device 186 with the individual imperfection profile 196 of the original item 180 transmitted by the transmission line 198 from the database 190. This comparison which may be performed within the comparing device 200 of the authentication apparatus may finally allow determining the authentication status 172 of the suspect item 180.

Summarizing as described in FIG. 16, the preferred authentication apparatus 176 configured for performing the method for determining the authentication status 172 according to the first embodiment as depicted in FIG. 15A may comprise the following parts:

178 Recording device: a device configured for recording the picture 110 of the printed version of a data matrix barcode printed onto an item 180 supported by a light source 182;

184 Decoding device: a device configured for decoding the at least one content from the picture of the printed version of the code;

186 Analyzing device: a device configured for analyzing irregularities in the picture 110 of the printed version of the data matrix barcode in order to derive the at least one individual imperfection profile 196 of the printed version of the data matrix barcode as printed on the suspect item 180;

188 Selecting device: a device configured for selecting, within a database 190, a database record 192 by using the barcode content to search for a database content 194 and also configured for obtaining an individual imperfection profile 196 of the original item 180 from the database record 192;

200 Comparing device: a device configured for comparing the individual imperfection profile 196 of the suspect item 180 with the individual imperfection profile 196 of the original item 180 transmitted by the transmission line 198 from the database 190.

FIG. 17 schematically displays a preferred embodiment of a proving apparatus 202 which is configured for proving the authentication of an original item 180. Herein, a code is assigned to the item 180 according to a set of rules, wherein the code comprises a plurality of modules 118 which are arranged in an ideal image 150. Hereby, at least one barcode content of the item 180 is encoded within the plurality of modules 118, wherein at least one picture of the printed version of the code is printed onto the item 180 with a printing device. In the preferred embodiment as depicted in FIG. 17, the proving apparatus 202 may comprise a providing device 204 configured for providing a plurality of original items 180, wherein a picture 110 of the printed version of each code may be printed onto the respective item 180. Hereby, it is emphasized that each item 180 may comprise a unique code being expressed in a unique picture 110 of the printed version of the code.

The proving apparatus 202 may further comprise an assessing device 206 configured for deriving at least one individual imperfection profile 196 for each of the original items 180. In this particular embodiment, the assessing device 206 may comprise a recording device 178 configured, according to part I.), for recording at least one picture 110 of the printed version of the code on each of the items 180, a decoding device 184 configured, according to part II.), for decoding the at least one barcode content from the picture 110 of the printed version of the code for each item 180, and an analyzing device 186 configured, according to part III.), for analyzing irregularities in the picture 110 of the printed version of the code for each item 180 for acquiring the individual imperfection profile 196 for each original item 180. Furthermore, the database generating apparatus 202 may comprise, according to part IV.), a generating device 208 configured for generating a database record 192 for each item 180, wherein each database record 192 may comprise at least the database content 194 and the individual imperfection profile 196 of the respective original item 180. The database 190 may be retrieved by the selecting device 188 in the authentication apparatus 196 as presented in FIG. 16. Alternatively, or in addition, the database generating apparatus 202 may comprise, according to part IV.), the same or a further printing device (not depicted here) configured for printing the individual imperfection profile 196 onto the item 180 in addition or as an alternative to storing the individual imperfection profile 196 of the respective original item 180 in the database 190.

Summarizing as described in FIG. 17, the proving apparatus 202 configured for proving the authentication of an original item 180 may, thus, comprise the following parts:

204 Providing device: a device configured for providing a plurality of original items 180 with a printed version of each code;

206 Assessing device: a device configured for deriving at least one individual imperfection 196 profile of each of the original items 180, particularly comprising the following sub-parts:

178 Recording device: a device configured for recording the picture 110 of the printed version of a data matrix barcode printed onto an item 180 supported by a light source 182;

184 Decoding device: a device configured for decoding the at least one content from the picture of the printed version of the code;

186 Analyzing device: a device configured for analyzing irregularities in the picture of the printed version of the data matrix barcode in order to calculate

208 Generating device: a device configured for generating a database record 192 for each item 180, each database record 192 comprising at least the database content 194 and the individual imperfection profile 196 of the respective original item 180.

LIST OF REFERENCE NUMBERS

110 Picture of the printed version of the code
112 Black module
114 White module
116 Linear, square or rectangular pattern
118 Module
120 Providing step
122 Deriving step
124 Recording step
126 Modifying step
128 Decoding step
130 Analyzing step
132 (Determining a) Deviation of the printed area of the modules
134 (Determining a) Deviation of the arrangement of the real grid
136 (Determining a) Deviation with respect to the position of the modules
138 (Determining a) Deviation of a boundary line
140 (Determining a) Deviation with respect to the position of at least one sub-group of modules
142 (Determining a) Deviation with respect to the contrast of the modules
144 (Determining a) Deviation concerning the position of the modules with respect to raster points
146 Calculating step
148 Storing step
150 Ideal image
152 Ideal Grid
154 Real Grid
155 Area
156 Ideal center of gravity
158 Real center of gravity
160 Boundary curve
162 Sub-group of modules
164 Raster points
165 Contact point
165A Straight Line
165B Curved Line
165C Intensity
166 Transmission step
168 Selecting step
170 Comparing step
172 Authentication status
174 Returning step
176 Authentication apparatus
178 Recording device
180 Item (Bottle)
182 Light source
184 Decoding device
186 Analyzing device
188 Selecting device
190 Database
192 Database record 194 Database content
196 Individual imperfection profile
198 Transmission line
200 Comparing device
202 Proving apparatus
204 Providing device
206 Assessing device
208 Generating device While this invention has been described as having an exemplary design, the present invention may be further modified within the spirit and scope of this disclosure. This application is therefore intended to cover any variations, uses, or adaptations of the invention using its general principles.

What is claimed is:

1. A method for proving an authentication of an original item, wherein a code is assigned to the item according to a set of rules, the code comprising a plurality of modules arranged in an ideal image, wherein at least one barcode content of the item is encoded within the plurality of modules, wherein at least one picture of the printed version of the code is printed onto the item with an original printing device, the method comprising the following steps:
   i) recording at least one picture of the printed version of the code printed onto the item;
   ii) decoding the barcode content from the picture;
   iii) analyzing irregularities in the same picture of step ii) by identifying at least one deviation in the picture with respect to the ideal image and calculating a numerical value describing an individual imperfection profile of the original printing device, wherein the calculating of the numerical value of the individual imperfection profile depends on at least one unique feature inherently related to the original printing device, wherein the at least one unique feature is selected from at least one of a printing technology and a setting of the printing device;
   iv) storing the individual imperfection profile by at least one of printing the individual imperfection profile onto the item or generating a database record for the item, the database record comprising at least the barcode content and the individual imperfection profile.

2. The method of claim 1, wherein step iii) comprises at least one of the following sub-steps:
   iii1) determining, for at least one module, the deviation between an area effectively printed in the picture of the module with respect to the area of the module in the ideal image;
   iii2) determining a deviation between a real grid effectively printed in the picture and the ideal grid in the ideal image;
   iii3) determining, for at least one module, a deviation between a real center of gravity of the module effectively printed in the picture with respect to an ideal center of gravity of the module in the ideal image;
   iii4) determining a boundary curve effectively printed in the picture as a deviation from a straight line in the ideal image;
   iii5) determining, for at least one sub-group of modules, a deviation between the real center of gravity of the sub-group of modules effectively printed in the picture with respect to the ideal center of gravity of the sub-group of the modules in the ideal image;
   iii6) determining, for at least one module, a deviation between a contrast in the module with respect to the contrast within a printed area in the picture;
   iii7) determining for at least one module, a deviation concerning a relative position of neighboring raster points of at least one of an underlying low-density image and an overprinted low-density image.

3. The method of claim 2, wherein a number of the sub-steps iii1) to iii7) are selected for calculating the numerical value of the individual imperfection profile depending on at least one of the printing technology and the setting of the printing device.

4. The method of claim 1, wherein step i) comprises at least one of the following sub-steps:
   i1) locating the picture of the printed version of the code;
   i2) rearranging a spatial orientation of the picture;
   i3) cutting the picture at least at one side or at one edge;
   i4) transforming the picture into a binary format.

5. The method of claim 1, wherein step i) comprises at least one of the following sub-procedures which are applied to the picture of the printed version of the code:
   isolating an image of the barcode from any other parts of the picture;
   verifying a correct exposition of the picture;
   examining a distribution of an illumination over the picture;
   reviewing a contrast of picture;
   disproving an existence of a blur within the picture.

6. The method of claim 1, wherein the item is selected from the group consisting of: a physical object; an accompanying article; a primary packaging; and a secondary packing.

7. The method of claim 6 wherein the article is one of a label and a document, the primary packaging is one of a bottle, a syringe, a vial, an ampoule, a carpule, and a blister, and the secondary packing is one of a folding box, a hangtag, a cardboard box, a shipping carton, and a container.

8. The method of claim 1, wherein the set of rules allows generating at least one of a two-dimensional barcode, a one-dimensional barcode, and a dot code and wherein the set of rules is retrieved from a standard specification defining the code.

9. A computer program including computer-executable instructions for performing the method of claim 1 when the program is executed on a computer or computer network.

10. A method for determining an authentication status of a suspect item, wherein a code is assigned to the item according to a set of rules, the code comprising a plurality of modules arranged in an ideal image, wherein at least one barcode content of the item is encoded within the plurality of modules, wherein at least one picture of the printed version of the code is printed onto the item with a printing device, the method comprising the steps of:
   a) recording at least one picture of the printed version of the code printed onto the item;
   b) decoding the barcode content from the picture;
   c) analyzing irregularities in the same picture of step b) by identifying at least one deviation in the picture with respect to the ideal image as generated by applying the set of rules related to the barcode content and calculating a numerical value describing an individual imperfection profile of the printing device, wherein the calculating of the numerical value of the individual imperfection profile depends on at least one unique feature inherently related to the printing device, wherein the at least one unique feature is selected from at least one of a printing technology and a setting of the printing device;
   d) checking whether the code on the suspect item has been printed with the original printing device by comparing the individual imperfection profile of the suspect item with the stored individual imperfection profile of the original item, by which comparison the authentication status of the suspect item is determined.

11. The method of claim 10, wherein a transmission of data to a data processing unit is performed via a computer network, wherein the further steps after the transmission are performed by the data processing unit, wherein the authentication status of the suspect item is returned by the data processing unit, wherein the data are transmitted by at least one control unit, the control unit being adapted to perform or to having performed at least method step a), wherein the data transmission takes place after one or more of the method steps step a), step b), or step c).

12. The method of claim 10, wherein the item is selected from the group consisting of: a physical object; an accompanying article; a primary packaging; and a secondary packing.

13. The method of claim 12, wherein the article is one of a label and a document, the primary packaging is one of a bottle, a syringe, a vial, an ampoule, a carpule, and a blister, and the secondary packing is one of a folding box, a hangtag, a cardboard box, a shipping carton, and a container.

14. The method of claim 10, wherein the set of rules allows generating at least one of a two-dimensional barcode, a one-dimensional barcode, and a dot code and wherein the set of rules is retrieved from a standard specification defining the code.

15. A computer program including computer-executable instructions for performing the method of claim 10 when the program is executed on a computer or computer network.

16. A proving apparatus for proving an authentication of an original item, wherein a code is assigned to the item according to a set of rules, wherein the code comprises a plurality of modules arranged in an ideal image, wherein at least one barcode content of the item is encoded within the plurality of modules, wherein at least one picture of the printed version of the code is printed onto the item with a printing device, the assigning apparatus comprising:
   I) a recording device configured for recording at least one picture of the printed version of the code printed onto the item;
   II) a decoding device configured for decoding the barcode content from the picture;
   III) an analyzing device configured for analyzing irregularities in the picture by identifying at least one deviation in the same picture as used in the decoding device with respect to the ideal image and for calculating a numerical value describing an individual imperfection profile of the printing device, wherein the calculating of the numerical value of the individual imperfection profile depends on at least one unique feature inherently related to the printing device, wherein the at least one unique feature is selected from at least one of a printing technology and a setting of the printing device;
   IV) a storing device for storing the individual imperfection profile, wherein the storing device comprises at least one of the same or a further printing device configured for printing the individual imperfection profile onto the item or a generating device configured for generating a database record for the item, wherein the database record comprises at least the barcode content and the individual imperfection profile.

17. An authentication apparatus for determining an authentication status of a suspect item, wherein a code is assigned to the item according to a set of rules, wherein the code comprises a plurality of modules arranged in an ideal image, wherein at least one barcode content of the item is encoded within the plurality of modules, wherein at least one picture of the printed version of the code is printed onto the item with a printing device, the authentication apparatus comprising:
   A) a recording device configured for recording at least one picture of the printed version of the code printed onto the item;
   B) a decoding device configured for decoding the barcode content from the picture;
   C) an analyzing device configured for analyzing irregularities in the picture by identifying at least one deviation in the same picture as used in the decoding device with respect to the ideal image and for calculating a numerical value describing an individual imperfection profile of the printing device, wherein the calculating of the numerical value of the individual imperfection profile depends on at least one unique feature inherently related to the printing device, wherein the at least one unique feature is selected from at least one of a printing technology and a setting of the printing device;
   D) a comparing device configured for comparing the individual imperfection profile of the suspect item with the individual imperfection profile of the original item, by which comparison the authentication status of the suspect item is determined.

18. The authentication apparatus of claim 17, wherein the recording device comprises an optical system, the optical system comprising at least one element selected from the group consisting of: a flatbed scanner, a camera, a barcode hand-scanning device, a laptop webcam, a cellular phone, a smartphone, a tablet computer.

19. The authentication apparatus of claim 17, wherein the item is selected from a group consisting of: a physical object; an accompanying article; a primary packaging; and a secondary packing.

20. The authentication apparatus of claim 19, wherein the article is one of a label and a document, the primary packaging is one of a bottle, a syringe, a vial, an ampoule, a carpule, and a blister, and the secondary packing is one of a folding box, a hangtag, a cardboard box, a shipping carton, and a container.

* * * * *